(12) United States Patent
Morishige et al.

(10) Patent No.: US 8,446,816 B2
(45) Date of Patent: May 21, 2013

(54) CONTROL METHOD FOR ACCESS GATEWAY AND COMMUNICATION SYSTEM

(75) Inventors: Takehiro Morishige, Kawasaki (JP); Tohru Setoyama, Fujisawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 422 days.

(21) Appl. No.: 12/484,308

(22) Filed: Jun. 15, 2009

(65) Prior Publication Data

US 2010/0061226 A1 Mar. 11, 2010

(30) Foreign Application Priority Data

Sep. 5, 2008 (JP) ................................. 2008-228938

(51) Int. Cl.
*G01R 31/08* (2006.01)
*H04L 12/28* (2006.01)

(52) U.S. Cl.
USPC ............ 370/216; 370/229; 370/231; 370/389

(58) Field of Classification Search
USPC .................... 370/216, 229–231, 389; 713/11, 713/13
See application file for complete search history.

(56) References Cited

U.S. PATENT DOCUMENTS

| | | | | |
|---|---|---|---|---|
| 2004/0258065 A1* | 12/2004 | Akyol et al. | .................. | 370/389 |
| 2005/0237926 A1* | 10/2005 | Cheng et al. | .................. | 370/216 |
| 2006/0198296 A1* | 9/2006 | Majee et al. | .................. | 370/216 |
| 2007/0177589 A1* | 8/2007 | Endo | .............................. | 370/389 |
| 2008/0020759 A1* | 1/2008 | Nagarajan et al. | ............. | 455/433 |

OTHER PUBLICATIONS

Sections 4. 4 and 4. 6 of "Basic IP Service for Converged Access Network Specification", 3rd Generation Partnership Project 2, Dec. 19, 2007.
6. 3. 5 of "Architecture Tenets, Reference Model and Reference Points", WiMAX Form NWG, Jul. 11, 2008.
6. 3. 5 of "Architecture Tenets, Reference Model and Reference Points", WiMAX Forum NWG, Jan. 11, 2008.

* cited by examiner

*Primary Examiner* — Brandon Renner
(74) *Attorney, Agent, or Firm* — Antonelli, Terry, Stout & Kraus, LLP.

(57) ABSTRACT

In order to provide a redundancy configuration to an access gateway apparatus in which a control plane and a user plane are separated, the access gateway apparatus includes: a control computer for receiving control signals from the networks to establish the communication path, thereby determining packet transfer information for the data; and a transfer computer for receiving the packet transfer information from the control computer to transfer the data through the communication path. The transfer computer includes: a plurality of first transfer computers for executing the transfer of the data; and a second transfer computer for taking over, when a fault occurs in any one of the plurality of first transfer computers. The control computer includes: a first control computer for processing the control signals received from the networks; and a second control computer for taking over, when a fault occurs in the first control computer.

9 Claims, 33 Drawing Sheets

| MSID | MS IP ADDRESS | GRE TUNNEL INFORMATION POINTER | MIP TUNNEL INFORMATION POINTER | ACCOUNTING INFORMATION POINTER | MS STATUS | AUTHENTICATION INFORMATION POINTER | SESSION LIFE TIME |
|---|---|---|---|---|---|---|---|
| A | 10.10.10.10 | | | | ACTIVE | | 3600s |
| B | 10.10.10.11 | | | | ACTIVE | | 500s |

FIG. 5B

| MSID | MS IP ADDRESS | GRE TUNNEL INFORMATION POINTER | MIP TUNNEL INFORMATION POINTER | ACCOUNTING INFORMATION POINTER | MS STATUS |
|---|---|---|---|---|---|
| A | 10.10.10.10 | | | | ACTIVE |
| B | 10.10.10.11 | | | | ACTIVE |
| C | 10.10.10.12 | | | | IDLE |
| N | 10.10.10.13 | | | | IDLE |

*FIG. 6*

CONTROL METHOD FOR ACCESS GATEWAY AND COMMUNICATION SYSTEM

CLAIM OF PRIORITY

The present application claims priority from Japanese patent application JP2008-228938 filed on Sep. 5, 2008, the content of which is hereby incorporated by reference into this application.

BACKGROUND OF THE INVENTION

This invention relates to an access gateway apparatus for controlling user access in a network system. More particularly, this invention relates to redundancy control and a session restoration method in an access gateway apparatus that includes a control access gateway apparatus (C-AGW apparatus) for mainly processing a control signal and a plurality of user access gateway apparatuses (U-AGW apparatuses) for mainly processing user packet transfer.

Popularization of broadband Internet services or third-generation mobile stations now enables a large number of users to use various services at any time of day. A carrier as a service provider has to build an access network system that may accommodate subscribers increasing in number year by year and deal with an increasing number of data access lines without any service stoppage. In a field of mobile wireless access communication, an increase in number of sessions and improvement of wireless communication band now require great improvement in throughput of the access gateway apparatus that accommodates wireless base stations (BSs). An exemplary access gateway apparatus is discussed in Sections 4.4 and 4.6 of "Basic IP Service for Converged Access Network Specification", 3rd Generation Partnership Project 2, Dec. 19, 2007.

SUMMARY OF THE INVENTION

Under those circumstances, in a wireless access network such as an ultra mobile broadband/converged access network (UMB/CAN) of 3rd Generation Partnership Project 2 (3GPP2), which is a third generation mobile communication standardization organization, separation of a control plane for processing a control message and a user plane for processing user data from each other has been promoted, and Sections 6.3.5 of "Architecture Tents, Reference Model and Reference Points", WiMAX Form NWG, Jul. 11 2008 disclose separation of a data (user data) path and a signaling (control signal) path from each other in the access gateway apparatus (AGW).

Further, regarding an access service gateway (ASN-GW) that is an access gateway of a worldwide interoperability for microwave access (WiMAX) system, Section 6.3.5 of "WiMAX Forum NWG_R1_V1.2-Stage-2-Part 1" discloses separation of a control plane from a user plane for processing user data.

FIG. 28 illustrates a known example of a configuration of a network system using WiMAX. FIG. 28 is a block diagram illustrating a conventional example of the network system to which WiMAX is applied. As illustrated in FIG. 28, the network system of WiMAX includes a mobile station (MS) 8, a plurality of base stations (BSs) 7a to 7c that communicate with the mobile station 8, a core network 1 equipped with an authentication apparatus 2 and a home agent (HA) 3, and an access gateway apparatus (AGW) 4x for transferring a control signal and user data between the base stations 7a to 7c and the core network 1.

The access gateway apparatus 4x separately includes a control signal access gateway (C-AGW) 5 for processing the control signal (signaling) between the base stations 7a to 7c and the core network 1 and a user data access gateway (U-AGW) 6 for transferring user data between the base stations 7a to 7c and the home agent 3 of the core network 1.

An example of a connection sequence of the mobile station 8 in the configuration of FIG. 28 is as illustrated in FIG. 29. FIG. 29 illustrates a conventional example of a connection sequence for WiMAX of FIG. 28. The connection sequence of FIG. 29 is for WiMAX of FIG. 28, in which the ordinate indicates time, and the abscissa indicates each apparatus. Hereinafter, the base stations 7a to 7c are generically referred to as base stations 7.

In Step S1, the mobile station 8 performs initial ranging with the base station 7. In Step S2, the mobile station 8 makes a request for communication speed (transmission capacity) or modulation method to the C-AGW 5 of the access gateway apparatus 4x via the base station 7. The C-AGW 5 executes basic capabilities negotiation to allocate a communication speed to the mobile station 8 according to a communication state of the base station 7.

In Step S3, upon issuance of a connection request from the mobile station 8, the base station 7 makes a connection request to the C-AGW 5 of the access gateway apparatus 4x based on predetermined IDs (mobile station ID: MS ID and base station ID: BS ID). In Step S4, the C-AGW 5 makes inquiries about the connection request from the mobile station 8 to the authentication apparatus 2 to execute authentication. In Steps S5 and S6, after completion of the authentication, the C-AGW 5 negotiates with the home agent 3 and the base station 7 for a data path to an end point of the mobile station 8. For data path establishment with the base station 7, the BS ID and a tunnel endpoint are designated to start negotiation for the data path. The C-AGW 5 may designate an end gateway apparatus of user data for the base station 7 by setting an address of the U-AGW 6 in the tunnel endpoint. The C-AGW 5 carries out proxy mobile IP (P-MIP) connection negotiation with the home agent 3 to determine a transfer path (MIP tunnel) of the user data. In this case, negotiation of a control signal of the P-MIP via the U-AGW 6 enables setting of an end gateway apparatus of the user data for the home agent 3 to the U-AGW 6. In Step S7, the C-AGW 5 notifies the U-AGW 6 of the determined transfer path (data path). In Step S8, the U-AGW 6 executes transfer of the user data between the mobile station 8 and the base station 7 and the home agent 3 through the data path notified by the C-AGW 5. As illustrated in FIG. 29, the U-AGW 6 sets a generic routing encapsulation (GRE) tunnel with the base station 7, and a MIP tunnel with the home agent 3 to execute user data transfer.

The WiMAX illustrated in FIGS. 28 and 29 is an example of separation, in the access gateway apparatus 4x, into the control plane for processing the control signal and the user plane for processing the user data, i.e., separation into the C-AGW 5 and the U-AGW 6. When the control plane and the user plane coexist in one access gateway apparatus 4x as described above, depending on throughput or a physical memory amount of a processor of the access gateway apparatus 4x, a packet transfer speed, session establishment time, or a maximum number of sessions varies. To solve this problem, separation of a control plane and a user plane is employed as illustrated in FIG. 28, enabling a apparatus (C-AGW) in charge of the control plane to perform more complex control and to deal with an increase in number of sessions. The user plane (U-AGW 6) may focus processing only on packet transfer, and therefore allocate apparatus resources to user data transfer because of no complex control signal, thereby increasing a transfer speed of the user data.

Further, for the future network system, there is a growing demand for limiting, to a minimum, service stop time (down time) caused by a fault of the access gateway apparatus (especially VoIP service). To shorten the service stop time, studies have been conducted on various redundancy configurations or session restoration control in the access gateway apparatus. For example, as a redundancy configuration of the access gateway apparatus illustrated in FIG. 28, an access gateway apparatus illustrated in FIGS. 30 to 32 may be employed.

For example, FIG. 30 is a block diagram when redundancy is achieved by N+1 access gateway apparatuses. In FIG. 30, a plurality of (N+1) access gateway apparatuses 10, 14 and 20 may be installed, and the plurality of access gateway apparatuses 10 and 14 may be operated as active systems while one access gateway apparatus 20 may be operated as a standby system. FIG. 30 illustrates, while only two access gateway apparatuses 10 and 14 are illustrated, an example where N access gateway apparatuses are present. An IP address of a 1st access gateway apparatus 10 is #1, and an IP address of an N-th access gateway apparatus 14 is #N. The active access gateway apparatuses 10 and 14 include control signal processing units 11 and 15 for processing control signals, packet transfer processing units 13 and 17 for processing user data, and pieces of session information 12 and 16 for storing session information of a mobile station and a home agent. The pieces of session information 12 and 16 may be stored in memories of the control signal processing units 11 and 15.

The standby access gateway apparatus 20 includes, as in the case of the active system, a control signal processing unit 21 for processing a control signal, a packet transfer processing unit 27 for processing user data, and N pieces of session information 22 to 26 for storing session information of a mobile station and a home agent. While FIG. 30 illustrates the pieces of session information 22 to 26, N pieces of session information are actually present.

The N active access gateway apparatuses 10 and 14 transmit pieces of session information 12 and 16 thereof to the standby access gateway apparatus 20 in a predetermined cycle. The standby access gateway apparatus 20 stores the received pieces of session information 22 to 26. For the pieces of session information 22 to 26 stored by the standby access gateway apparatus 20, it is only necessary to store pieces of latest session information. The standby access gateway apparatus 20 monitors faults of the N active access gateway apparatuses 10 and 14, and takes over the session information and the IP address received and stored from the faulty access gateway apparatus to become active upon detection of a fault.

In a configuration that includes N active systems and one standby system as in the case illustrated in FIG. 30, N+1 access gateway apparatuses each including a pair of a control plane and a user plane are disposed, and session control information of the N active access gateway apparatuses is restored by one standby system. Hereinafter, redundancy by N+1 access gateway apparatuses is referred to as N+1 redundancy.

FIG. 31 is a block diagram illustrating a 1:1 access gateway apparatus configuration. The redundancy configuration of the access gateway apparatuses of FIG. 31 includes one standby access gateway apparatus 35 for one active access gateway apparatus 30. The active access gateway apparatus 30 transmits session information 32 to the standby access gateway apparatus 35 in the predetermined cycle, and the standby access gateway apparatus 35 stores latest session information 37. The standby access gateway apparatus 35 monitors a fault of the active access gateway apparatus 30, and takes over the session information 37 and the IP address received and stored from the active access gateway apparatus 30 to become active upon detection of a fault.

Hereinafter, a redundancy configuration where one active system is restored by one standby system as in the case illustrated in FIG. 31 is referred to as 1:1 (active/standby) redundancy configuration.

FIG. 32 is a block diagram illustrating a 1:1 access gateway apparatus redundancy configuration. In the redundancy configuration of the access gateway apparatuses illustrated in FIG. 32, two active access gateway apparatuses 40 and 45 monitor a fault of each other, and the other active system takes over when a fault occurs in one active system.

The access gateway apparatus 40 transmits session information 42 to the other active access gateway apparatus 45 in the predetermined cycle, and stores session information 43 received from the access gateway apparatus 45 in the predetermined cycle. The access gateway apparatus 45 transmits, as in the case of the access gateway apparatus 40, session information 48 to the other active access gateway apparatus 40 in the predetermined cycle, and stores session information 47 received from the access gateway apparatus 40 in the predetermined cycle.

The two active access gateway apparatuses 40 and 45 monitor a fault of each other, and take over the session information and the IP address of the other active system stored in the own apparatus to continue processing based on two pieces of session information and two IP addresses when detecting a fault.

Hereinafter, a redundancy configuration where two active systems monitor a fault of each other to restore session control information as in the case illustrated in FIG. 32 is referred to as 1:1 (active/active) redundancy configuration.

For the redundancy configuration of the access gateway apparatuses each including a pair of a control plane and a user plane, as illustrated in FIGS. 30 to 32, the N+1 redundancy configuration, 1:1 (active/standby) redundancy configuration, or 1:1 (active/active) redundancy configuration may be employed.

Problems when redundancy is carried out by using such access gateway apparatuses are as follows.

In the case of the N+1 redundancy configuration, the standby access gateway apparatus 20 stores all pieces of session information 22 to 26 of the active access gateway apparatuses 10 and 14 that monitor faults. Thus, a memory capacity has to be increased to store the pieces of session information 22 to 26, causing an increase in apparatus cost. Especially, when the number of sessions of the access gateway apparatuses 10 and 14 is large, the memory capacity has to be increased according to the number of sessions.

In addition, the standby access gateway apparatus 20 cannot transfer user data until session information stored at the time of a fault in the active system is validated to notify the user plane of a transfer path, and setting of the transfer path is completed. Thus, time is necessary from an occurrence of a fault in the active access gateway apparatus 20 to permission of transfer by the standby system. When this time (downtime) is several seconds, in a case where the access gateway apparatus 20 provides voice services such as a telephone (VoIP), a voice is interrupted, causing degradation of service quality.

Further, because of the configuration where one standby system stores N pieces of active session information, traffic is enormous between the active system and the standby system, and a communication band is narrowed, reducing transfer performance of the user data. Especially, in the case of a network system having a large number of sessions, the amount of session information is enormous. Thus, transfer of session information causes a reduction in transfer performance of the user data.

In the case of 1:1 (active/standby) redundancy configuration of the access gateway apparatuses each including a pair of a control plane and a user plane, facility costs of the standby system increase, causing higher introduction expenses.

In the case of 1:1 (active/active) redundancy configuration of the access gateway apparatuses each including a pair of a control plane and a user plane, the other active system that takes over the faulty active system needs high throughput to execute the two active systems. As a result, facility costs increase, causing higher introduction expenses.

Thus, the access gateway apparatuses each including a pair of a control plane and a user plane have suffered from the difficulty of reducing downtime when a fault occurs while suppressing an increase in apparatus cost. In addition, the access gateway apparatuses have suffered from the difficulty of reducing downtime while suppressing apparatus costs, and reinforcing the user plane according to an increase of user data.

In view of the above-mentioned problems, this invention has been made, and therefore has an object to provide a redundancy configuration optimal to an access gateway apparatus in which a control plane and a user plane are separated from each other, thereby reducing downtime when a fault occurs while suppressing apparatus costs, and reinforcing the user plane according to an increase of user data.

To solve the problems, a communication system comprising: a router connected to a first network and a second network; and an access gateway apparatus connected to the router, for transferring data by establishing a communication path between the first network and the second network, wherein: the access gateway apparatus comprises: a control computer for receiving control signals from the first network and the second network to establish a communication path, thereby determining packet transfer information for the data; and a transfer computer for receiving the packet transfer information from the control computer to transfer the data between the first network and the second network through the communication path contained in the packet transfer information; the transfer computer comprises: a plurality of first transfer computers for executing the transfer of the data; and a second transfer computer for taking over, when a fault occurs in any one of the plurality of first transfer computers, processing of the faulty one of the plurality of first transfer computers; the control computer comprises: a session information notification unit for notifying each of the plurality of first transfer computers of information containing the determined communication path as session information; a session information storage unit for storing the session information for each identifier of the plurality of first transfer computers; a first fault monitoring unit for detecting an occurrence of a fault in any one of the plurality of first transfer computers; and a first switching control unit for obtaining, when the first fault monitoring unit detects the occurrence of the fault in any one of the plurality of the first transfer computers, an identifier and an address of the faulty one of the plurality of first transfer computers, and the session information set in faulty one of the plurality of the first transfer computers from the session information storage unit, and notifying the second transfer computer of the identifier, the address, and the session information that have been obtained; the second transfer computer comprises a redundant control unit for setting the identifier, the address, and the session information that have been received from the control computer in the second transfer computer to take over the transfer of the data; the control computer comprises: a first control computer for receiving the control signals from the first network and the second network to establish the communication path, thereby determining the packet transfer information for the data; and a second control computer for taking over, when a fault occurs in the first control computer, processing of the faulty first control computer; and the second control computer comprises: a second fault monitoring unit for detecting an occurrence of a fault in the first control computer; a session information copying unit for copying the session information from the first control computer in a predetermined cycle; and a second switching control unit for obtaining, when the second fault monitoring unit detects the occurrence of the fault in the first control computer, an identifier and an address of the faulty first control computer, setting the identifier and the address that have been obtained in the second control computer, and taking over processing of the first control computer based on the session information copied by the session information copying unit.

According to this invention, configuring a control computer for processing a control signal by 1:1 redundancy, configuring a transfer computer for transferring data by N+1 (or N+M) redundancy, and transmitting session information to the control computer or the transfer computer when the standby system takes over the active transfer computer enable quick recovery from a fault. Configuring the control computer by 1:1 redundancy, and configuring the transfer computer by N+1 (or N+M) redundancy enables limitation of the number of necessary computers to a minimum and reduction in introduction and maintenance costs of the communication system. When the number of sessions and the amount of data increase, active transfer computers may be added.

BRIEF DESCRIPTION OF THE DRAWINGS

FIG. 5B illustrates the session information 71 in detail.
FIG. 6 illustrates an example of packet transfer information stored in the RAM of the U-AGW.

FIG. 9 is a flowchart illustrating, in detail, processing executed when the C-AGW monitor processing program 76 executed by the standby C-AGW 5b receives a message of a mirroring request from the active C-AGW 5a.

FIG. 12 is a sequence diagram illustrating an example of redundant control when a fault occurs during an operation of the active U-AGW 6a.

FIG. 17 is a flowchart illustrating an example of second redundant control processing (session generation request processing: F8) of the U-AGW executed by the U-AGW monitor processing program 75 of the active C-AGW 5a.

FIG. 18 is a flowchart illustrating an example of processing executed when the redundant control program 67 of the standby U-AGW 6c has received a session create request from the active C-AGW 5a.

FIG. 20 is a sequence diagram illustrating an example of redundant control processing when a fault occurs during an operation of the active U-AGW 6a.

FIG. 23 is a sequence diagram illustrating an example of redundant control processing when a fault occurs during an operation of the active U-AGW 6a.

DETAILED DESCRIPTION OF THE PREFERRED EMBODIMENTS

Hereinafter, referring to the accompanying drawings, the preferred embodiments of this invention are described.

First Embodiment

Figure 1:
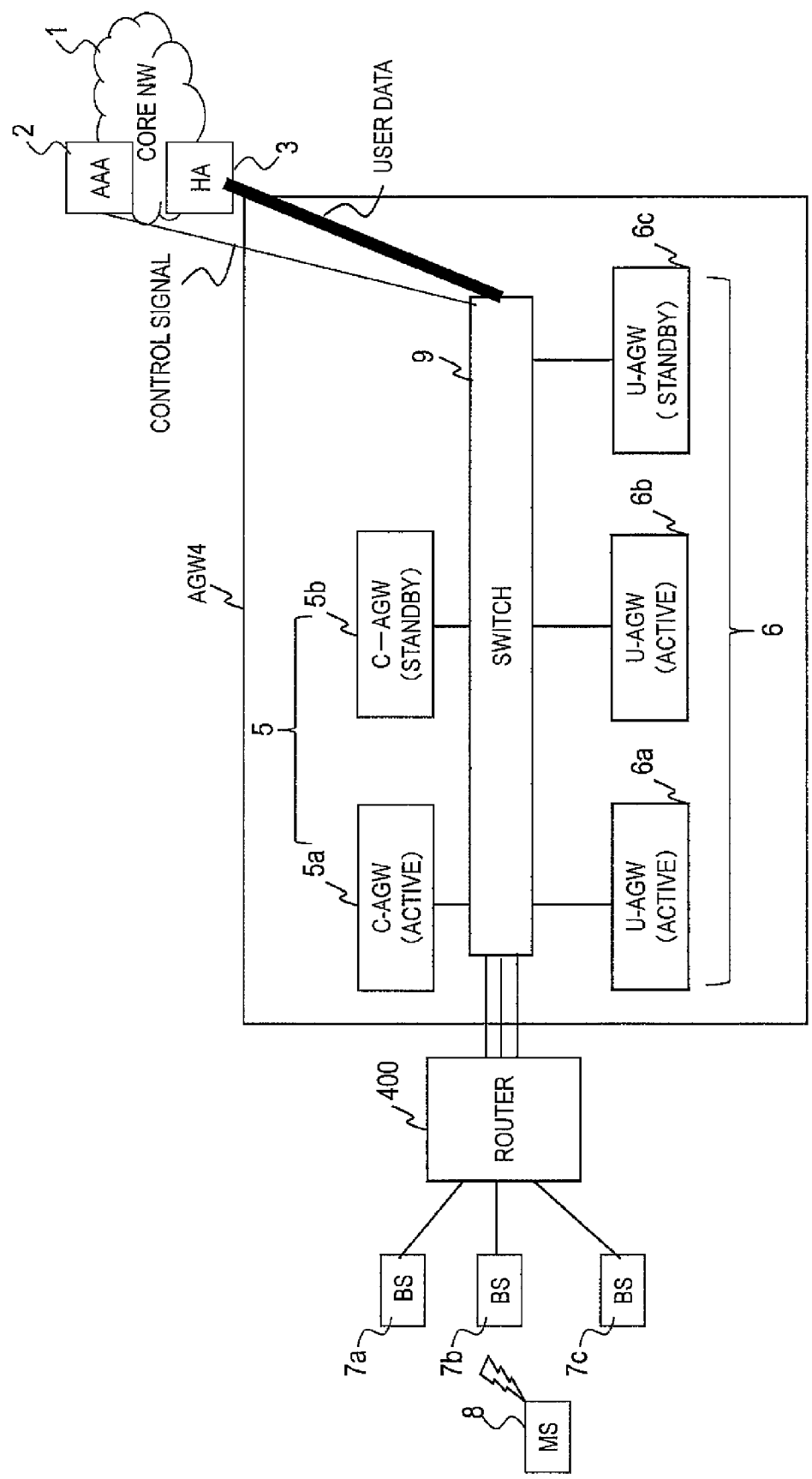
FIG. 1 is a block diagram illustrating an example of a wireless network system according to a first embodiment of this invention.

FIG. 1 is a block diagram illustrating an example of a wireless network system according to a first embodiment of this invention. For a wireless network of this embodiment, for example, the WiMAX described as the conventional example is employed.

In FIG. 1, the wireless network system includes a mobile station (MS) 8, a plurality of base stations (BSs) 7a to 7c that communicate with the mobile station 8, a core network 1 that includes an authentication apparatus 2 and a home agent (HA) 3 to communicate with an access gateway apparatus (AGW) 4, and a router 400 that interconnects the base stations 7a to 7c, the core network 1, and the access gateway apparatus 4. The access gateway apparatus 4 transfers a control signal and user data (data packet) between the base stations 7a to 7c and the core network 1.

The access gateway apparatus 4 separately includes a plurality of control signal access gateways (C-AGWs or control planes) 5a and 5b for processing a control signal (signaling) between the base stations 7a to 7c and the core network 1, and a plurality of user data access gateways (U-AGWs or user planes) 6a to 6c for transferring user data between the base stations 7a to 7c and the home agent 3 of the core network 1. The C-AGWs 5a and 5b and the U-AGWs 6a to 6c are connected to a switch 9. The switch 9 is connected to the core network 1 via the router 400 to transfer a control signal and user data between the access gateway apparatus 4 and the core network 1. If the mobile station 8 and the base station 7 comprise a first network, and the core network is a second network, the access gateway apparatus 4 adjusts a communication status and determines a communication path between the first and second networks by the C-AGWs 5 based on the control signal, and transfers user data through the determined communication path by the U-AGWs 6.

The C-AGWs that process a control signal and monitor the active c-AGW and the U-AGWs include an active C-AGW 5a for processing the control signal during normal time and a standby C-AGW 5b for taking over processing of the faulty C-AGW 5a. Hereinafter, the active C-AGW 5a and the standby C-AGW 5b are generically referred to as C-AGWs 5 (control planes).

The U-AGWs that processes user data include active U-AGWs 6a and 6b for processing the control signal during normal time and a standby U-AGW 6c for taking over processing of the user data when a fault occurs in one of the active U-AGWs 6a and 6b. Hereinafter, the active U-AGWs 6a and 6b and the standby U-AGW 6c are generically referred to as U-AGWs 6 (user planes). The base stations 7a to 7c are generically referred to as base station 7.

In the access gateway apparatus 4 of this invention, the C-AGW 5 that processes the control signal is subjected to 1:1 redundancy processing by the active C-AGW 5a and the standby C-AGW 5b, and the active C-AGW 5a manages pieces of session information of the active U-AGWs 6a and 6b. The U-AGW 6 that transfers the user data is subjected to N+1 redundancy processing by N active U-AGWs and one standby U-AGW 6c. For session allocation to the active U-AGW 6, a control signal processing program 70 of the active C-AGW 5a determines sessions to be allocated to the active U-AGWs 6a and 6b according to the number of sessions, and notifies the active U-AGWs 6a and 6b of the sessions. For example, the active C-AGW 5a may allocate sessions such that the numbers of sessions transferred by the active U-AGWs 6a and 6b are almost equal. Alternatively, the active C-AGW 5a may allocate sessions so as to prevent the amounts of data transferred by the active U-AGWs 6a and 6b from exceeding a predetermined threshold value.

Configuration of C-AGW

Figure 2:
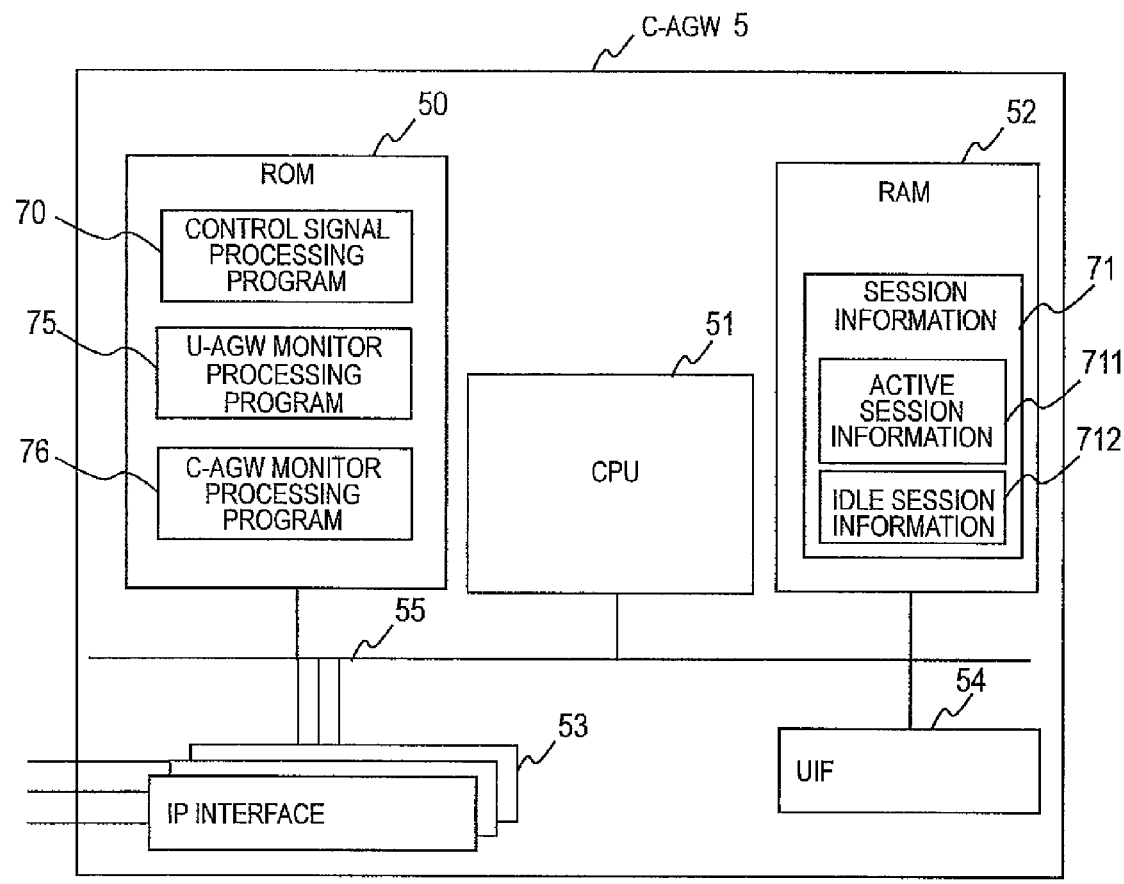
FIG. 2 is a block diagram illustrating a configuration of the C-AGW serving as the control plane according to the first embodiment of this invention.

Next, a configuration of the C-AGW 5 is described. FIG. 2 is a block diagram illustrating a configuration of the C-AGW 5 serving as the control plane according to the first embodiment of this invention. The active C-AGW 5a and the standby C-AGW 5b are similar in configuration but different in programs to be operated during normal time.

In FIG. 2, the C-AGW 5 includes a CPU (processor) 51 for performing an arithmetic operation, a ROM (nonvolatile memory) 50 for storing programs, a RAM (volatile memory) 52 for temporarily storing programs loaded from the ROM 50 or data used by the CPU 51, a communication (IP) interface 53 connected to the switch 9 to control communication, a user interface 54 for receiving setting information from a management console (not shown), and a computer (control computer) including an internal network (or internal bus) 53 for interconnecting the components.

The ROM 50 stores a control signal processing program 70 for processing a control signal from the mobile station 8, the base station 7 or the core network 1 to determine a transfer path of user data, a C-AGW monitor processing program 76 for monitoring the active C-AGW 5a, and a U-AGW monitor processing program 75 for monitoring the active U-AGW 6.

The RAM 52 stores loaded programs to be executed by the CPU 51, and session information 71 for each of the active U-AGWs 6a and 6b. Generally, in the wireless network, to effectively utilize a wireless band, session information managed by the access gateway with respect to a connected status of the terminal is largely classified into two. Session information indicating a communicable status or an ongoing communication status of a mobile station is defined as active session information, and the access gateway establishes transfer paths (data paths) with the base station and the HA in this case. Session information indicating a power-saving status or a long-time no communication status of the mobile station is defined as idle session information. The access gateway establishes a transfer path only with the HA in this case. When a user packet addressed to the mobile station is received from the HA in the idle status, the access gateway changes the mobile station to an active status by using a paging function unique to the wireless network to establish a transfer path again with the base station.

In the C-AGW 5, pieces of session information 71 of the U-AGWs are sorted to be stored according to the communication statuses of the mobile station. For example, session information indicating execution of communication is stored as active session information 711, session information indicating suspended communication (or power-saving mode of the mobile station 8) is stored as idle session information 712, whereby pieces of session information are sorted according to communication statuses.

The active C-AGW 5a loads the control signal processing program 70 and the U-AGW monitor processing program 75 into the RAM 52 to execute them by the CPU 51. The standby C-AGW 5b loads the C-AGW monitor processing program 76 into the RAM 52 to execute it by the CPU 51. When the C-AGW monitor processing program 76 of the standby C-AGW 5b detects a fault of the active C-AGW 5a, as described below, the control signal processing program 70 and the U-AGW monitor processing program 75 are activated to take over processing of the active system based on the session information 71 obtained from the active C-AGW 5a. A conventional well-known method may be used for fault detection. For example, the monitor processing program 76 of the standby C-AGW 5b transmits a WatchDog request to the active C-AGW 5a to monitor a WatchDog response from the active C-AGW 5a in a predetermined monitoring cycle, and determines a fault occurrence of the active C-AGW 5a when no WatchDog response comes even after a predetermined fault determination time has elapsed. The C-AGW monitor processing program 76 of the standby C-AGW 5b takes over processing from the active C-AGW 5a.

Figure 29:
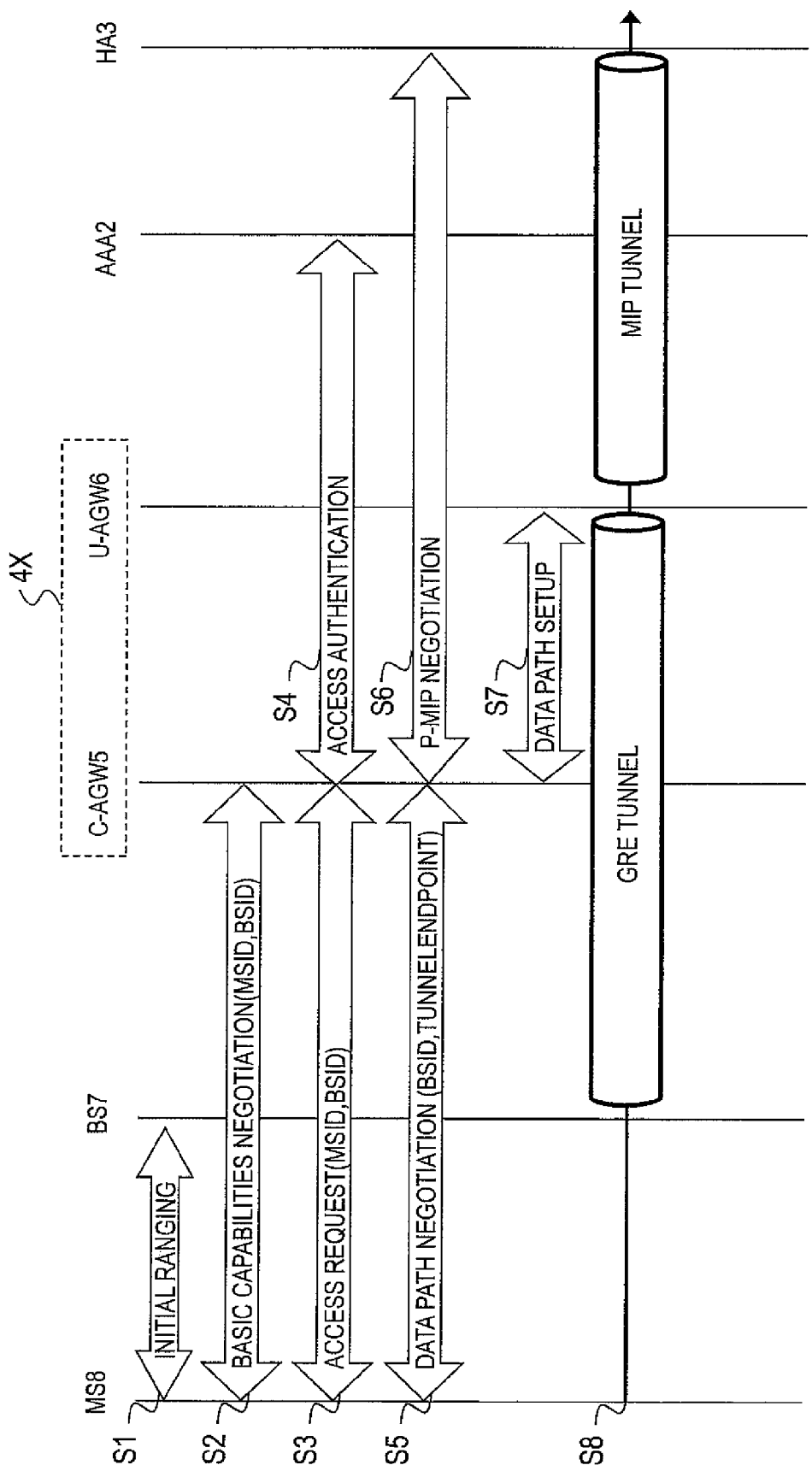
FIG. 29 illustrates a conventional example of a connection sequence for WiMAX of FIG. 28.
Figure 30:
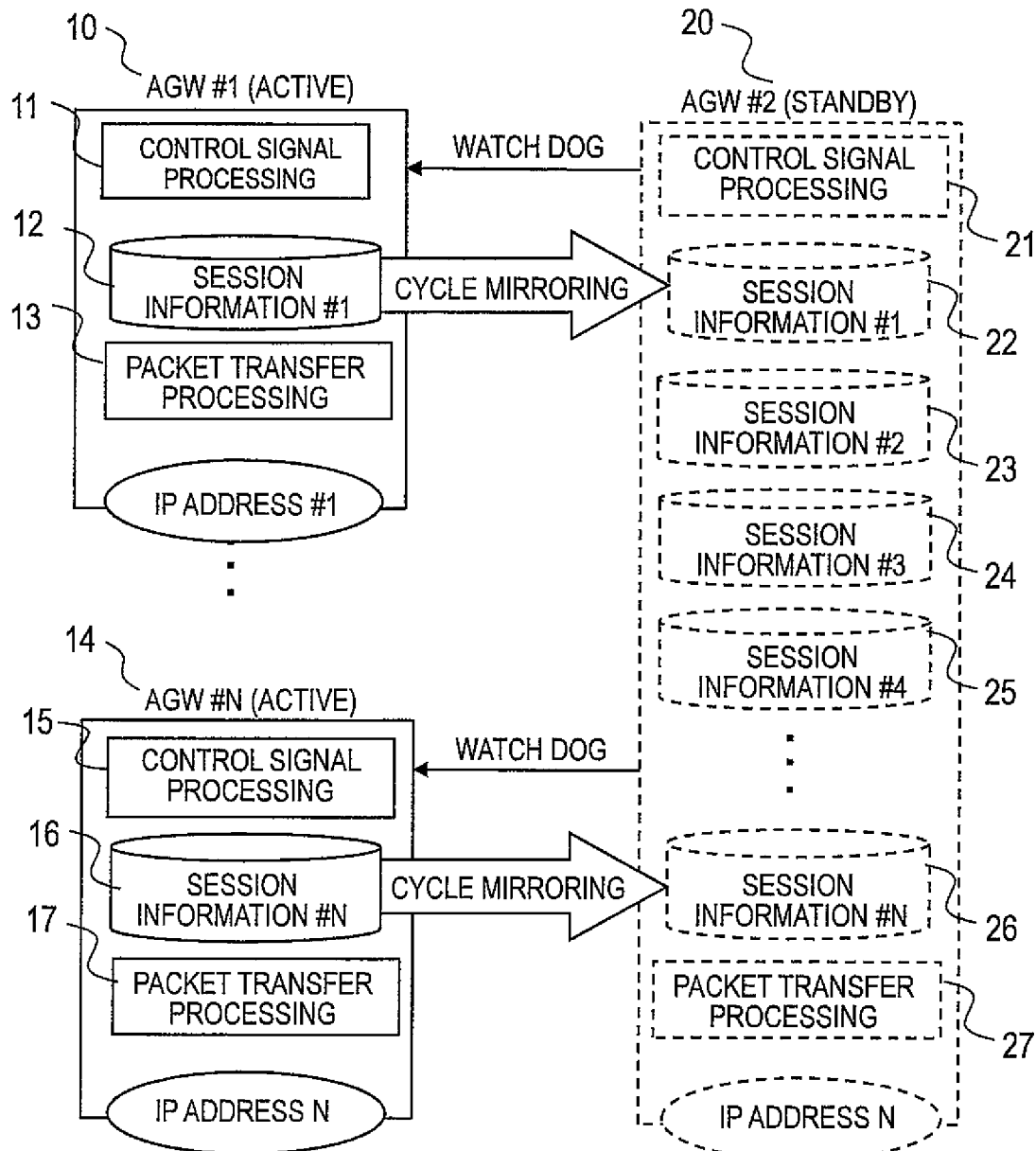
FIG. 30 is a block diagram when redundancy is achieved by N+1 access gateway apparatuses.
Figure 31:
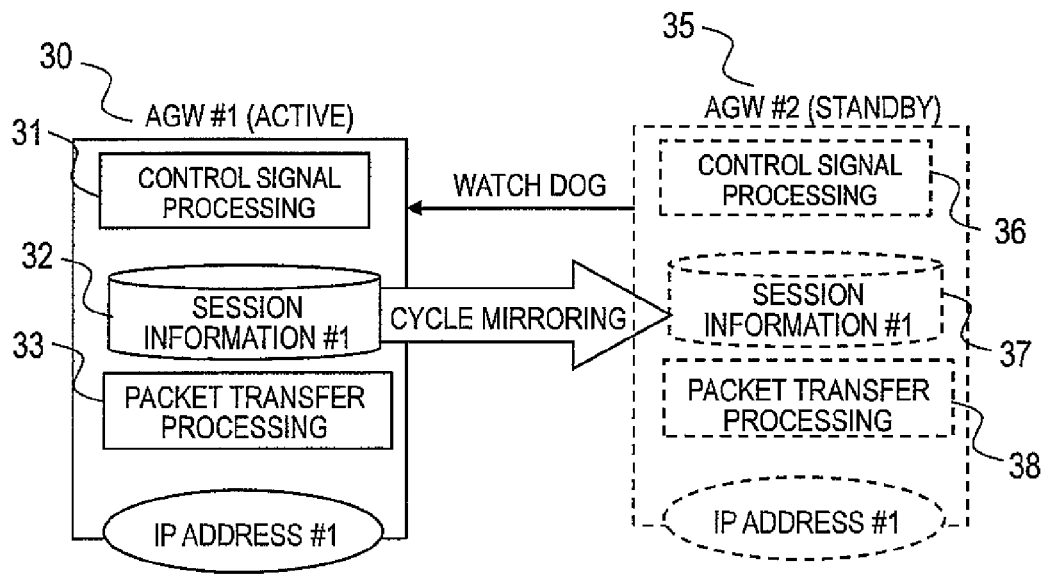
FIG. 31 is a block diagram illustrating a 1:1 access gateway apparatus configuration.
Figure 32:
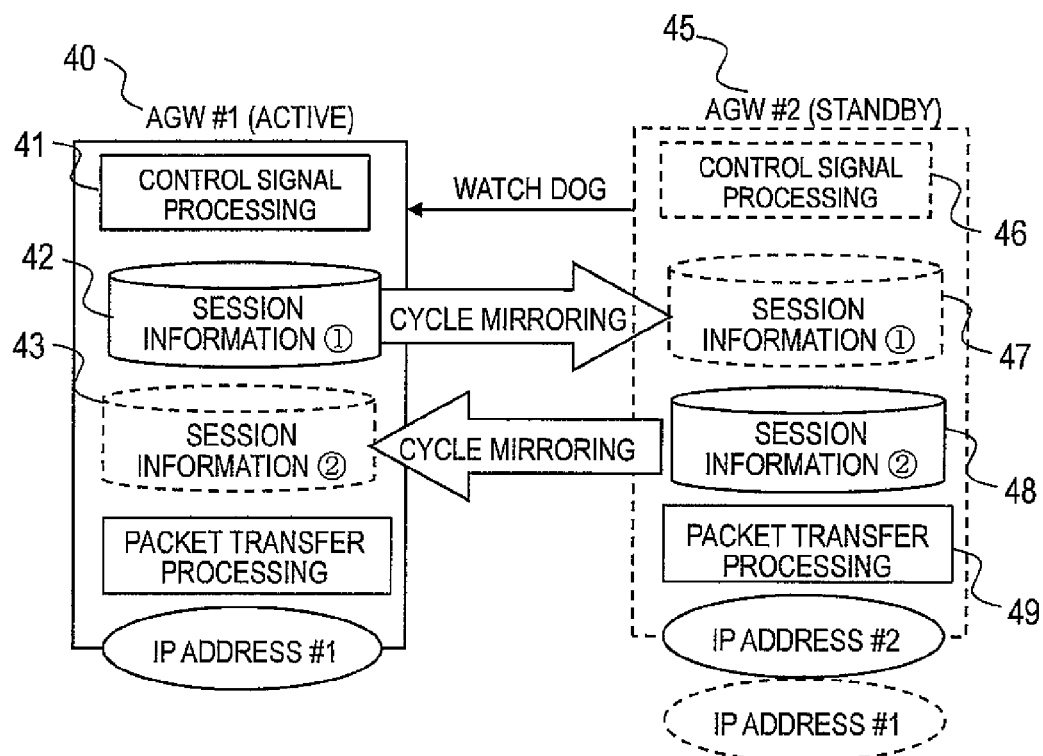
FIG. 32 is a block diagram illustrating a 1:1 access gateway apparatus redundancy configuration.

Processing contents of the control signal processing program 70 are similar to those of FIG. 29 described above in the background art. Authentication is carried out at the authentication apparatus 2 according to a connection request from the mobile terminal 8, and connection negotiation of a proxy mobile IP (P-MIP) is carried out with the home agent 3 to determine a transfer path (MIP tunnel) of the user data. Data path setting negotiation is carried out with the base station 7 to determine a transfer path (GRE tunnel) of the user data. Then, the control signal processing program 70 notifies the U-AGW 6 of the determined transfer path (data path). The control signal processing program 70 stores the session information 71 containing information of the data paths set with the base station 7 and the home agent 3 in the RAM 52. The control signal processing program 70 transmits session information 71 of each U-AGW to the standby C-AGW 5b to store a copy of the session information 71 in the standby C-AGW 5b. This processing may be carried out by the control signal processing program 70 of the active C-AGW 5a and the C-AGW monitor processing program 76 of the standby C-AGW 5b. The control signal processing program 70 of the active C-AGW 5a transmits session information 71 in a predetermined update cycle. The C-AGW monitor processing program 76 of the standby C-AGW 5b receives the session information 71 to store its copy in the RAM 52.

The active U-AGWs 6a and 6b transfer user data with the mobile station 8, the base station 7 and the home agent 3 based on packet transfer information (data path) received from the active C-AGW 5a.

The U-AGW monitor processing program 75 executed by the active C-AGW 5a monitors the active U-AGWs 6a and 6b, and instructs, when detecting a fault, the standby U-AGW 6c to take over processing of the faulty active U-AGWs 6a and 6b. The U-AGW monitor processing program 75 detects a fault of the active U-AGW 6 based on presence/absence of a WatchDog response to a WatchDog request as in the case of the C-AGW monitor processing program 76.

Configuration of U-AGW

Figure 3:
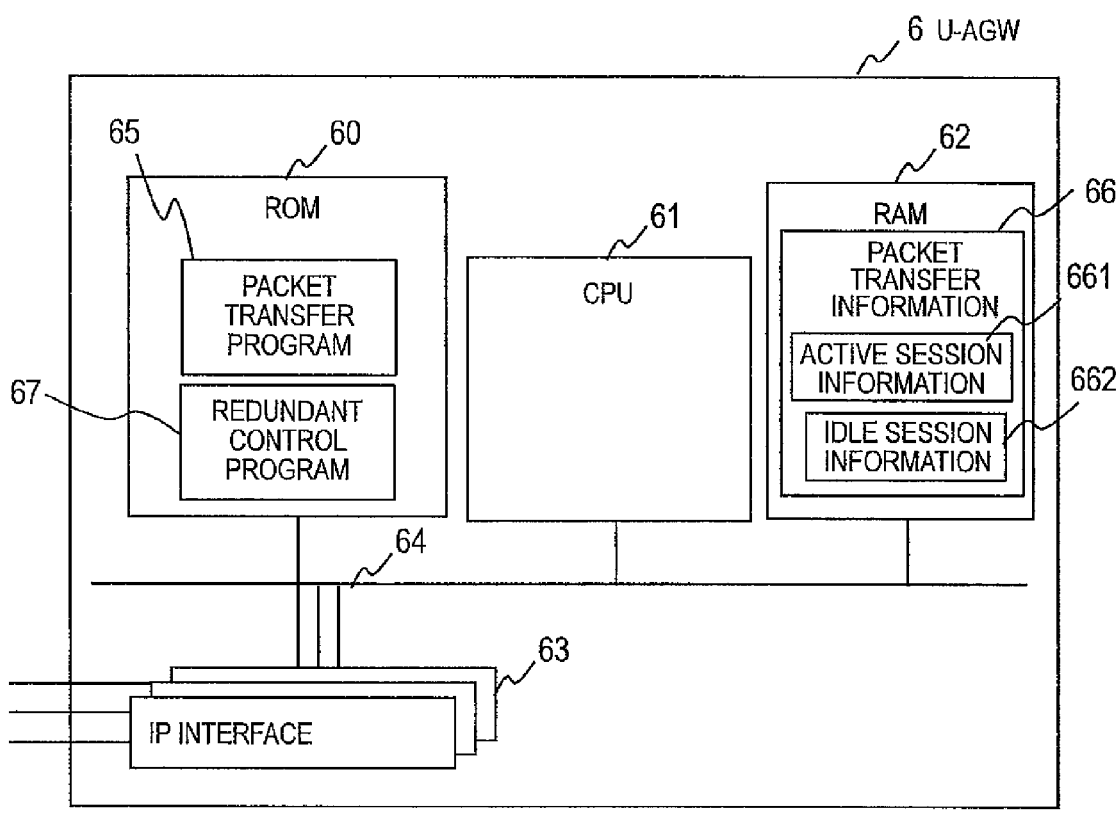
FIG. 3 is a block diagram illustrating the configuration of the U-AGW.

Next, a configuration of the U-AGW 6 for transferring user data is described. FIG. 3 is a block diagram illustrating the configuration of the U-AGW 6. The active U-AGWs 6a and 6b and the standby U-AGW 6c are similar in configuration but different in programs to be operated during normal time.

In FIG. 3, the U-AGW 6 includes a processor (CPU) 61 for performing an arithmetic operation, a nonvolatile memory (ROM) 60 for storing programs, a volatile memory (RAM) 62 for temporarily storing programs loaded from the ROM 60 or data used by the CPU 61, a communication (IP) interface 63 connected to the switch 9 to control communication, and a computer (packet transfer computer) including an internal network (or internal bus) 63 for interconnecting the above-mentioned components.

The ROM 60 stores a packet transfer program 65 for transferring user data from the mobile station 8, the base station 7 or the core network 1 through a designated transfer path, and a redundant control program 67 for receiving a redundant command from the active C-AGW 5*a* to activate the packet transfer program 65.

The RAM 62 stores programs loaded to be executed by the CPU 61, and a transfer path (session information) of user data received from the active C-AGW 5*a* as packet transfer information 66. In the packet transfer information 66, session information indicating ongoing communication is stored as active session information 661, and session information indicating suspended communication is stored as idle session information 662.

The packet transfer program 65 transfers user data (packet) with the mobile station 8 and the home agent 3 through a transfer path designated by the packet transfer information 66 received from the active C-AGW 5*a*.

The redundant control program 67 receives an identifier, an IP address and session information 71 (including active session information 711 and idle session information 712) of a user plane, from which transfer processing of the user data is to be taken over, from the active C-AGW 5*a*, and sets the identifier and the IP address of the user plane, from which the processing is to be taken over in the standby U-AGW 6*c*. The redundant control program 67 sets packet transfer information 66 from the session information 71 to activate the packet transfer program 65. The packet transfer program 65 executes transfer of user data according to the packet transfer information 66.

As illustrated in FIG. 29, the active U-AGW 6 sets a generic routing encapsulation (GRE) tunnel between the base station 7 and the access gateway apparatus 4, and the U-AGWs 6*a* and 6*b* set a MIP tunnel between the home agent 3 and the access gateway apparatus 4 to execute transfer of user data.

When a fault occurs in any one of the active U-AGWs 6*a* and 6*b*, the standby U-AGW 6*c* receives packet transfer information 66 and an IP address of an active U-AGW, from which the processing is to be taken over, from the active C-AGW 5*a*, and takes over the processing of the faulty active U-AGW.

Processing Flow in Access Gateway Apparatus

Figure 4:
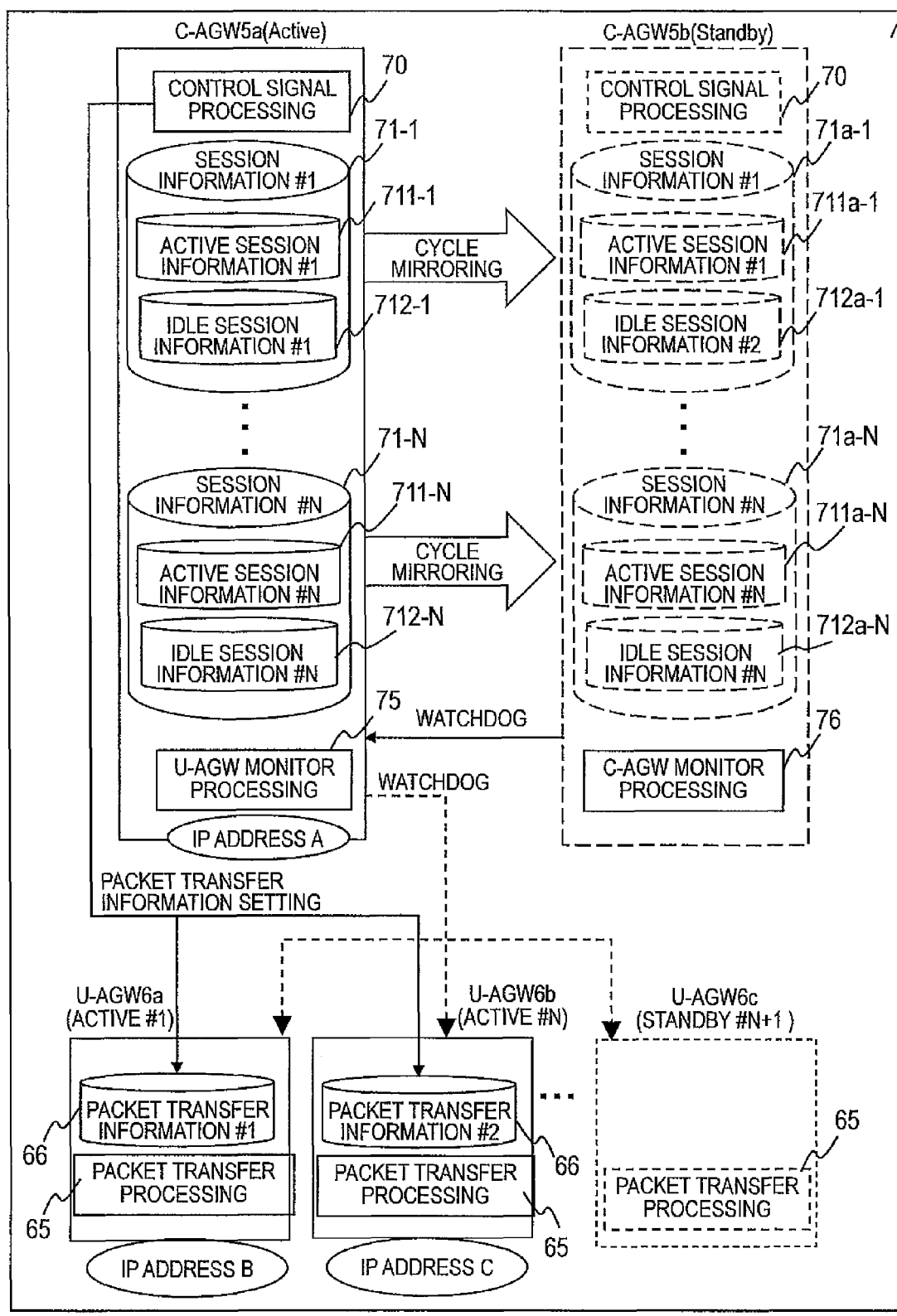
FIG. 4 is a block diagram illustrating a relationship of function elements between the C-AGW and the U-AGW illustrated in FIG. 2

FIG. 4 is a block diagram illustrating a relationship of function elements between the C-AGW 5 and the U-AGW 6 illustrated in FIGS. 2 and 3. FIG. 4 illustrates a status where the C-AGW 5 and the U-AGW 6 normally operate.

The active C-AGW 5*a* executes the control signal processing program 70 and the U-AGW monitor processing program 75, while the standby C-AGW 5*b* executes the C-AGW monitor processing program 76. An IP address A is set in the active C-AGW 5*a*, and a control signal is processed with the base station 7 or the home agent 3 via the router 400.

In the U-AGW 6, N U-AGWs 6 (U-AGW 6*a* is a first active apparatus, and U-AGW 6*b* is an N-th active apparatus) operate as active U-AGWs for the active system, and one standby U-AGW 6*c* stands by. An IP address B is set in the active U-AGW 6*a*, and an IP address C is set in the active U-AGW 6*b*. In the active U-AGWs 6*a* and 6*b*, packet transfer programs 65 operate, and under data is transferred with the base station 7 and the home agent 3 via the router 400.

The control signal processing program 70 of the active C-AGW 5*a* processes the control signal as described above to notify each of the active U-AGWs 6 of packet transfer information 66, and sorts pieces of session information 71-1 to 71-N of the active U-AGW 6 into pieces of active session information 711-1 to 711-N and pieces of idle session information 712-1 to 712-N to store them in the RAM 52. The control signal processing program 70 transmits the pieces of session information 71-1 to 71-N of the U-AGW 6 stored in the RAM 52 to the standby C-AGW 5*b* in the predetermined update cycle. The standby C-AGW 5*b* stores copies of the pieces of session information 71*a*-1 to 71*a*-N in the RAM 52. The standby C-AGW 5*b* stores, in the RAM 52, pieces of active session information 711*a*-1 to 711*a*-N and pieces of idle session information 712*a*-1 to 712-N as copied pieces of session information 71*a*-1 to 71*a*-N. A generic name of active session information 711-1 to 711-N is active session information 711, and a generic name of idle session information 712-1 to 712-N is idle session information 712.

With this configuration, the standby C-AGW 5*b* stores copies 71*a*-1 to 71*a*-N of the pieces of session information 71-1 to 71-N of N user planes. The active C-AGW 5*a* transmits session information 71 to the standby C-AGW 5*b* in the predetermined update cycle to update the copies 71*a*-1 to 71*a*-N of the session information to the latest information. Thus, performing 1:1 redundancy processing in the control plane and mirroring the session information enable efficient utilization of resources of the control plane. Mirroring the session information enables the standby C-AGW 5*b* to take over processing based on the copied session information 71*a* within a short time period from a fault occurrence of the active C-AGW 5*a* and to be used for a network for voice services.

In the control plane, no user data transfer is carried out. Thus, even when the number of sessions increases, the control signal may be processed without any influence on throughput of packet transfer.

In the user plane, N+1 redundancy processing is carried out to copy packet transfer information in the control plane, and hence the user date may be efficiently transferred.

Figure 5A:
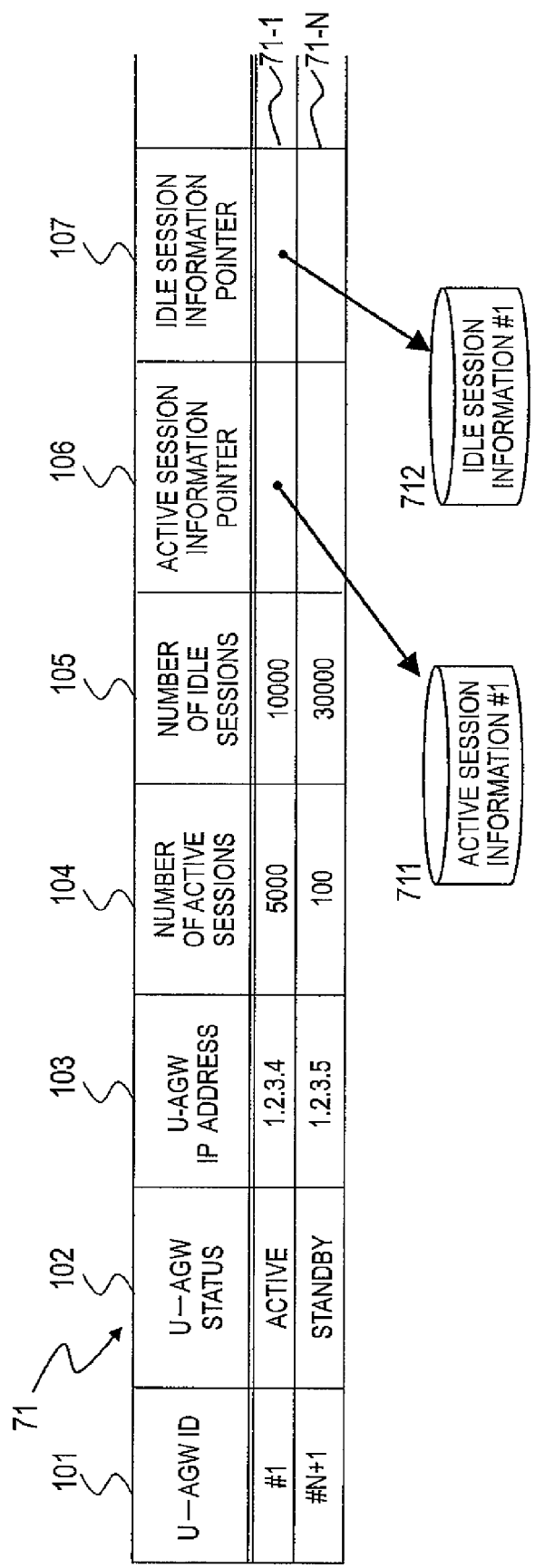
FIG. 5A illustrates the session information 71 in detail.
Figure 5C:
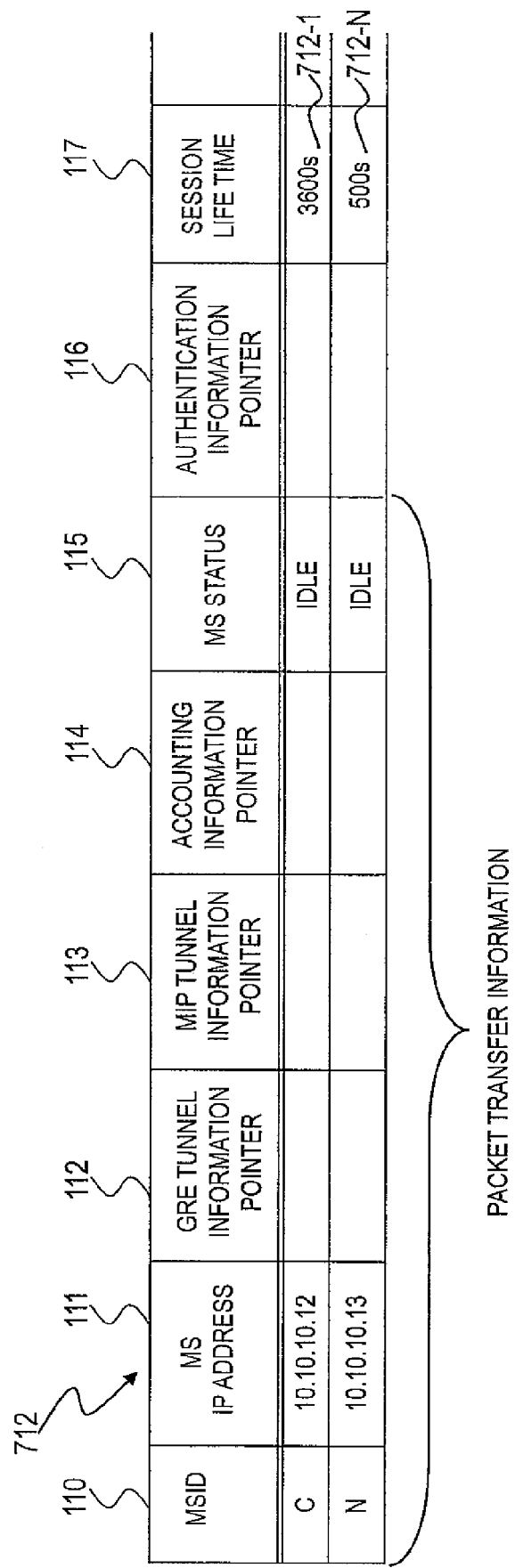
FIG. 5C illustrates the session information 71 in detail.

FIGS. 5A to 5C illustrate the session information 71 in detail. FIG. 5A illustrates an example of the session information 71. FIG. 5B illustrates an example of the active session information 711 constituting the session information 71. FIG. 5C illustrates an example of the idle session information 712 constituting the session information 71.

As illustrated in FIG. 5A, the session information 71 includes main information for each U-AGW 6 (control information regarding connection), a pointer indicating active session information 711 for each U-AGW 6, and a pointer indicating idle session information 712 for each U-AGW 6. Each pointer stores an address in the RAM 52 of the C-AGW 5*a*.

In FIG. 5A, an entry of the session information 71 includes a U-AGW ID 101 for storing an identifier of the U-AGW 6 managed by the C-AGW 5*a*, a U-AGW status 102 for storing which of active and standby the U-AGW 6 designated by the identifier is, a U-AGW IP address 103 for storing an IP address set in the U-AGW 6, the number of active sessions 104 for storing the number of sessions being communicated among the numbers of sessions processed by the U-AGW 6, the number of idle sessions 105 for storing the number of stopped sessions among the numbers of sessions processed by the U-AGW 6, a pointer 106 indicating a storage destination of active session information 711 of each U-AGW 6, and a pointer 107 indicating a storage destination of idle session information 712 of each U-AGW 6.

FIG. 5B illustrates an example of the active session information 711 designated by the pointer 106 of the session information 71. An entry of the active session information 711 includes an MS ID 110 for storing an identifier of the mobile station 8 that transfers user data, an MS IP address 111 for storing an IP address of the mobile station 8, a GRE tunnel information pointer 112 for storing a pointer indicating GRE tunnel information, an MIP tunnel information pointer 113 for storing a pointer indicating MIP tunnel information, an accounting information pointer 114 for storing accounting information for the mobile station 8, an MS status 115 for storing "Active" indicating a communication status of the mobile station 8, a pointer 116 indicating authentication information of the mobile station 8, and a session lifetime 117.

In the active session information 711, information of the MS ID 110 to MS status 115 constitutes packet transfer information 66 which the U-AGW 6 is notified of.

FIG. 5C illustrates an example of the idle session information 712 designated by the pointer (idle session information pointer) 107 of the session information 71. The idle session information 712 is different from the active session information 711 in that the MS status 115 is "Idle" but similar thereto in other elements.

FIG. 6 illustrates an example of packet transfer information 66 stored in the RAM 62 of the U-AGW 6. An entry of the packet transfer information 66 includes an MS ID 120 for storing an identifier of the mobile station 8 to which user data is transferred, an MS IP address 121 for storing an IP address of the mobile station 8, a GRE tunnel information pointer 122 for storing a pointer indicating GRE tunnel information, an MIP tunnel information pointer 123 for storing a pointer indicating MIP tunnel information, an accounting information pointer 124 for storing accounting information of the mobile station 8, and an MS status 125 for storing a communication status of the mobile terminal 8.

The packet transfer information 66 is configured to store the packet transfer information of the active session information 711 and the idle session information 712 of FIGS. 5B and 5C. The packet transfer information 66 is stored by each U-AGW 6, and includes information regarding a communication destination (MS ID 120) and a path specified from the active C-AGW 5a.

Failover of Control Plane

Figure 7:
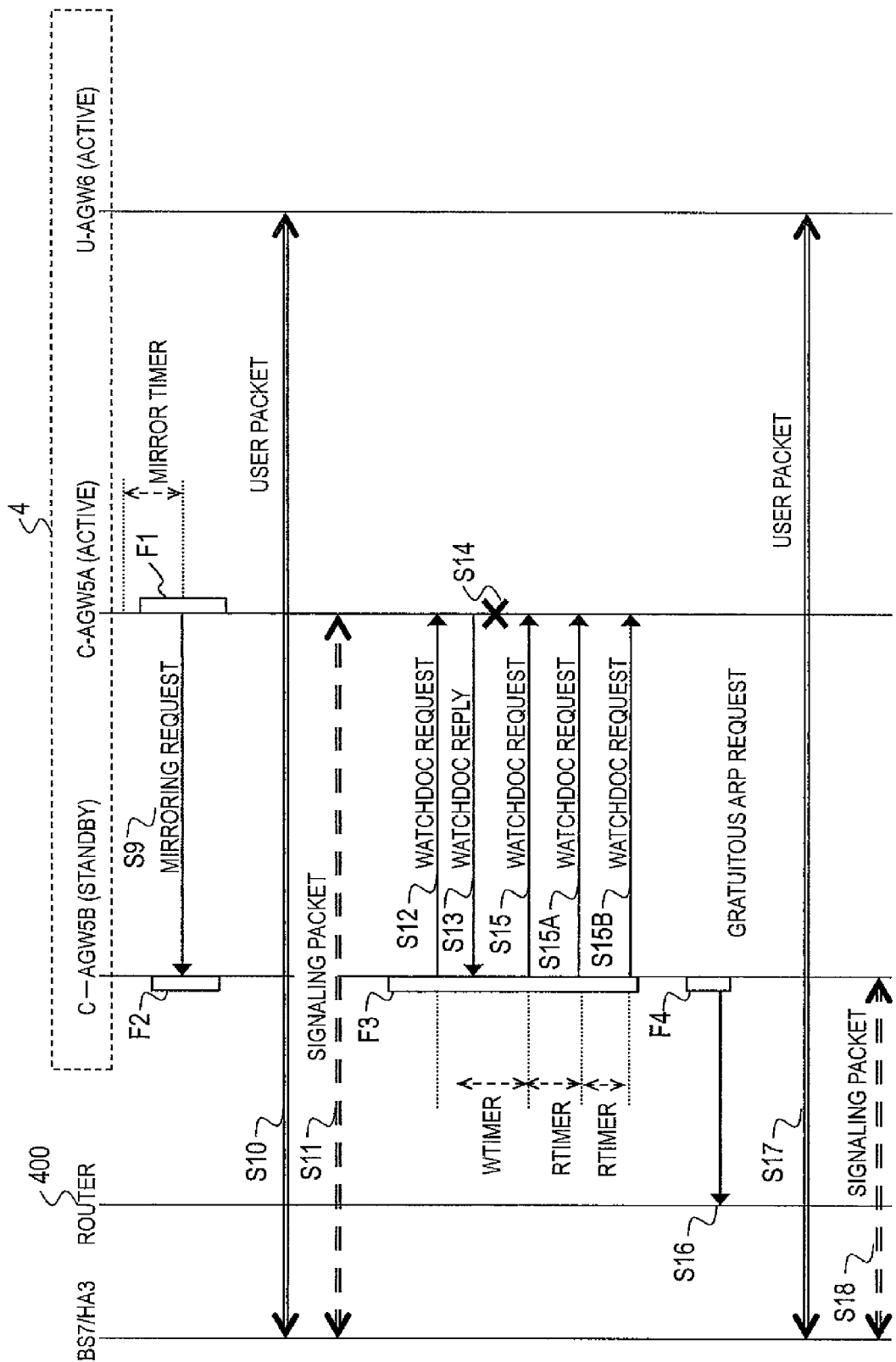
FIG. 7 is a sequence diagram illustrating an example of redundant control when a fault occurs during an operation of the active C-AGW.

FIG. 7 is a sequence diagram illustrating an example of redundant control when a fault occurs during an operation of the active C-AGW 5a. In FIG. 7, the ordinate indicates time, and the abscissa indicates the apparatuses including the base station 7 or the home agent 3, the router 400, the active C-AGW 5a, the standby C-AGW 5b, and the active U-AGW 6.

First, in Step S9, the active C-AGW 5a issues a mirroring request for copying session information 71 to the standby C-AGW 5b for each passage of a predetermined update cycle (cycle of mirroring timer) by mirroring processing (F1) of the control signal processing program 70. The standby C-AGW 5b stores a copy of the received session information 71 in the RAM 52.

In Step S10, the active U-AGW 6 transfers user data (user packet) between the base station 7 and the home agent 3 via the router 400. In Step S11, the active C-AGW 5a processes a control signal from the base station 7 or the home agent 3 via the router 400 as described above.

In Step S12, the standby C-AGW 5b carries out WatchDog processing (F3) by the C-AGW monitor processing program 76 to transmit a Watchdog request to the active C-AGW 5a in the predetermined monitoring cycle (cycle of WatchDog timer). In Step S13, the active C-AGW 5a that has received the WatchDog request returns a predetermined message as a WatchDog response. If the active C-AGW 5a normally operates, each processing is repeated by the above flow.

In Step S14, if a fault occurs in the active C-AGW 5a, the active C-AGW 5a returns no WatchDog response even with a passage of predetermined fault determination time (within cycle of response timer) after transmission of a WatchDog request from the standby C-AGW 5b. In steps 15a and S15b, the standby C-AGW 5b transmits WatchDog requests a predetermined number of times in each fault determination time.

If no WatchDog response may be received from the active C-AGW 5a even when WatchDog requests are transmitted a predetermined number of times, the standby C-AGW 5b determines a fault occurrence in the active C-AGW 5a to activate redundant control (F4).

In Step S16, the standby C-AGW 5b takes over an IP address (=A) set in the active C-AGW 5a, and then transmits a gratuitous ARP to the router 400. Thus, the router 400 may change a transfer destination of the IP address (=A) to the standby C-AGW 5b. Then, the standby C-AGW 5b activates the control signal processing program 70 and the U-AGW monitor processing program 75 to activate processing of a control signal and monitoring of the U-AGW 6.

Having taken over the control signal processing, the standby C-AGW 5b processes the control signal received from the base station 7 or the home agent 3 via the router 400. Transfer of the user data is carried out at the base station 7 or the home agent 3, the router 400 and the active U-AGW 6 as in the case before the occurrence of a fault in the active C-AGW 5-a.

This way, the session restoration processing that takes over processing of the control signal by the standby C-AGW 5b when a fault occurs in the active C-AGW 5a is completed.

Each of the processes F1 to F4 illustrated in FIG. 7 is described below in detail.

Figure 8:
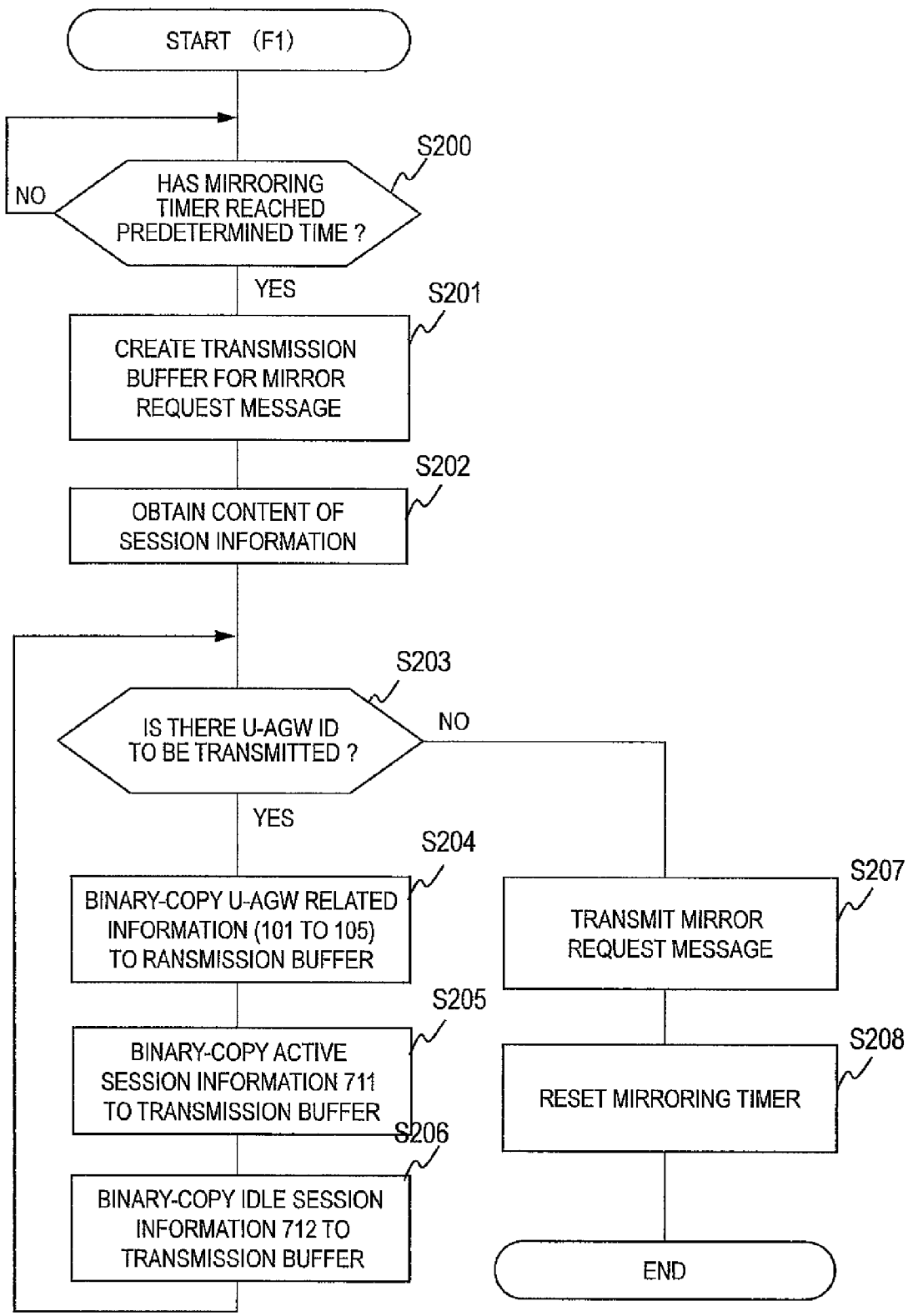
FIG. 8 is a flowchart illustrating, in detail, mirroring processing (transfer processing of the session information 71) carried out by the control signal processing program 70 of the active C-AGW.

FIG. 8 is a flowchart illustrating, in detail, mirroring processing (transfer processing of the session information 71) carried out by the control signal processing program 70 of the active C-AGW 5a.

First, in Step S200, whether the mirroring timer has reached the predetermined update cycle is judged. If the mirroring timer has not reached the predetermined update cycle, the processing proceeds to Step S201.

In Step S201, a transmission buffer is set in the RAM 52 for the active C-AGW 5a to transmit a message of a mirroring request for copying session information 71 to the standby C-AGW 5b.

In Step S202, the active C-AGW 5a obtains contents of the session information 71, and repeats Steps S203 to S206 to create a message. In Step S203, the active C-AGW 5a repeats Steps S204 to S206 until there is no more entry of a transmission target having an identifier of the U-AGW 6 stored in U-AGW_ID 101 of the session information 71 illustrated in FIG. 5A. If there is still an entry of a transmission target in the session information 71, the active C-AGW 5a proceeds to Step S204 to create a message. If there is no entry of a transmission target left in the U-AGW_ID 101 of the session information 71, the active C-AGW 5a proceeds to Step S207.

In Step S204, the active C-AGW 5a copies the values of the U-AGW_ID 101 to the number of idle sessions 105 in the session information 71 illustrated in FIG. 5A to the transmission buffer. In Step S205, the active C-AGW 5a copies active session information 711 specified by the active session information pointer 106 of the session information 71 to the transmission buffer. In Step S206, the active C-AGW 5a copies idle session information 712 specified by the idle session information pointer 107 of the session information 71 to the transmission buffer.

After completion of message creation for all the entries of the session information 71, in Step S207, the active C-AGW 5a transmits contents of the transmission buffer to the standby C-AGW 5b. The active C-AGW 5a resets the mirroring timer to prepare for next transmission.

Thus, the active C-AGW 5a transmits the session information 71 to the standby C-AGW 5b in each predetermined update cycle.

Figure 9:
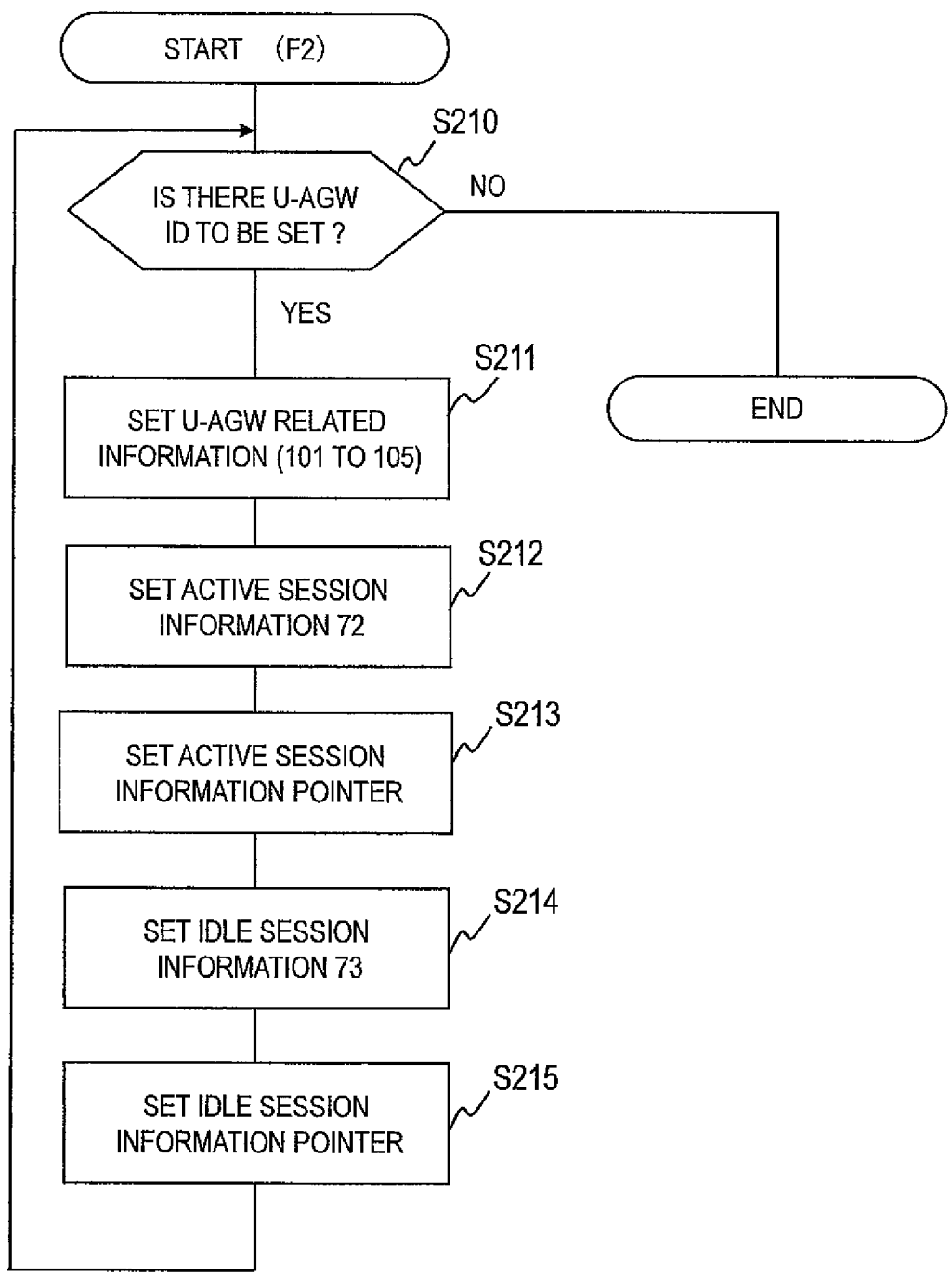

FIG. 9 is a flowchart illustrating, in detail, processing executed when the C-AGW monitor processing program 76 executed by the standby C-AGW 5b receives a message of a mirroring request from the active C-AGW 5a.

Upon reception of a message of the session information 71 from the active C-AGW 5a, the standby C-AGW 5b updates pieces of session information 71a-1 to 71a-N illustrated in FIG. 4 to be stored in the RAM 52. First, in Step S210, whether setting of all the U-AGW_IDs of the received messages in the RAM 52 has been completed is judged. If not completed, the standby C-AGW 5a proceeds to Step S211 to set next U-AGW_IDs in the pieces of session information 71a-1 to 71a-N of the RAM 52. On the other hand, if setting of all the U-AGW_IDs of the received messages in the RAM 52 has been completed, the processing is finished.

In Step S211, the standby C-AGW 5b reads the values of the U-AGW_ID 101 to the number of sessions 105 of the session information 71 illustrated in FIG. 5A from the received message to update the values of the pieces of session information 71a-1 to 71a-N of the RAM 52.

In Step S212, the standby C-AGW 5b reads the active session information 71 illustrated in FIG. 5B from the received message to update pieces of active session information 711a-1 to 711a-N. In Step S213, the standby C-AGW 5b sets addresses in the RAM 52 of the pieces of active session information 711a-1 to 711a-N in the active session information pointers 106 of the pieces of session information 71a-1 to 71a-N.

In Step S214, the standby C-AGW 5b reads the idle session information 712 illustrated in FIG. 5C from the received message to update the pieces of idle session information 712a-1 to 712a-N. Then, in Step S215, the standby C-AGW 5b sets addresses in the RAM 51 of the pieces of idle session information 712a-1 to 712a-N in the idle session information pointers 107 of the pieces of session information 71a-1 to 71a-N.

Thus, the standby C-AGW 5b updates the pieces of session information 71a-1 to 71a-N of the RAM 52 from the message sent from the active C-AGW 5a, and stores copies of the pieces of session information 71-1 to 71-N of the active C-AGW 5a.

Figure 10:
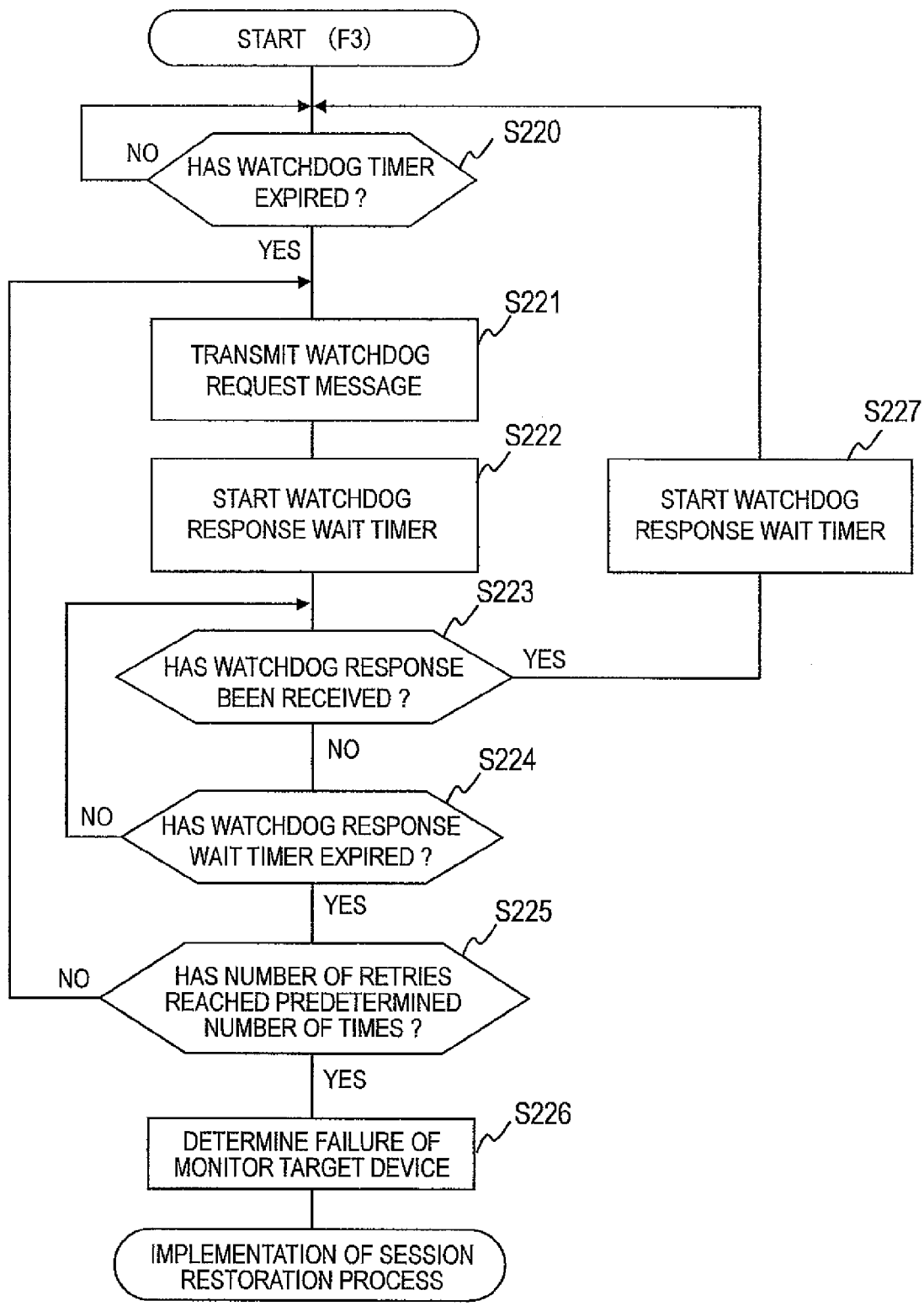
FIG. 10 is a flowchart illustrating, in detail, WatchDog processing F3 executed by the C-AGW monitor processing program 76 of the standby C-AGW 5b.

FIG. 10 is a flowchart illustrating, in detail, WatchDog processing F3 executed by the C-AGW monitor processing program 76 of the standby C-AGW 5b.

In Step S220, whether a WatchDog timer has counted up to a predetermined monitoring cycle is judged. If the predetermined monitoring cycle has passed, the processing proceeds to Step S221.

In Step S221, the standby C-AGW 5b transmits a WatchDog request to the active C-AGW 5a. In Step S222, the standby C-AGW 5b activates processing of waiting for a WatchDog response from the active C-AGW 5a.

In Step S223, the standby C-AGW 5b judges whether a WatchDog response has been received from the active C-AGW 5a. If not received, the processing proceeds to Step S224. If received, the processing proceeds to Step S227.

In Step S227, because a WatchDog response has been received, it is judged that the active C-AGW 5a normally operates, and the standby C-AGW 5b resets the WatchDog timer to resume counting of the predetermined monitoring cycle.

On the other hand, in Step S224, whether a value of a response timer for counting time after the setting of WatchDog response waiting has reached the predetermined fault judgment time is judged. If the value of the response timer has not reached the predetermined fault judgment time, the processing returns to Step S223 to wait for a WatchDog response. If the value of the response timer has passed the predetermined fault time, the processing proceeds to Step S225.

In Step S225, the standby C-AGW 5b adds 1 to the number of retries indicating the number of retransmitting WatchDog requests without receiving any WatchDog response. Then, the standby C-AGW 5b judges whether the number of retries has reached a predetermined number of times. If the number of retries has not reached the predetermined number of times, returning to Step S221, the standby C-AGW 5b retransmits a WatchDog request. On the other hand, if the number of retries has reached the predetermined number of times, proceeding to Step S226, the standby C-AGW 5b judges that a fault has occurred in the active C-AGW 5a to be monitored. The standby C-AGW 5b executes session restoration processing to take over processing from the active C-AGW 5a.

Thus, the standby C-AGW 5b transmits WatchDog requests in the predetermined monitoring cycle, retransmits a WatchDog request at each predetermined fault judgment cycle, and may detect the occurrence of a fault in the active C-AGW 5a when the number of retransmitting times has reached a predetermined number of times.

Figure 11:
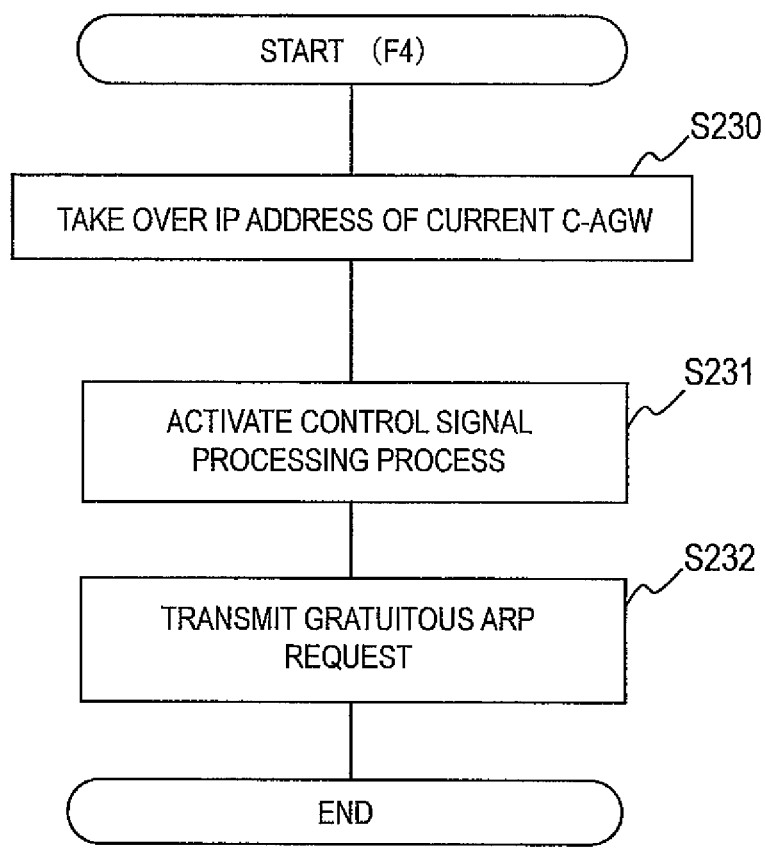
FIG. 11 is a flowchart illustrating, in detail, session restoration processing F4 executed by the C-AGW monitor processing program 76 of the standby C-AGW.

FIG. 11 is a flowchart illustrating, in detail, session restoration processing F4 executed by the C-AGW monitor processing program 76 of the standby C-AGW 5b.

Upon detection of a fault occurrence in the active C-AGW 5a, in Step S230, the C-AGW monitor processing program 76 of the standby C-AGW 5b takes over an IP address of the active C-AGW 5a. Then, in Step S231, the standby C-AGW 5b activates the control signal processing program 70.

In Step S232, the standby C-AGW 5b transmits a gratuitous ARP to the router 400 to change a transfer destination of the taken-over IP address (=A) to the standby C-GW 5b. The standby C-AGW 5b activates the control signal processing program 70 and the U-AGW monitor processing program 75 to execute processing of a control signal and monitoring of the U-AGW 6.

Failover of User Plane

Figure 12:
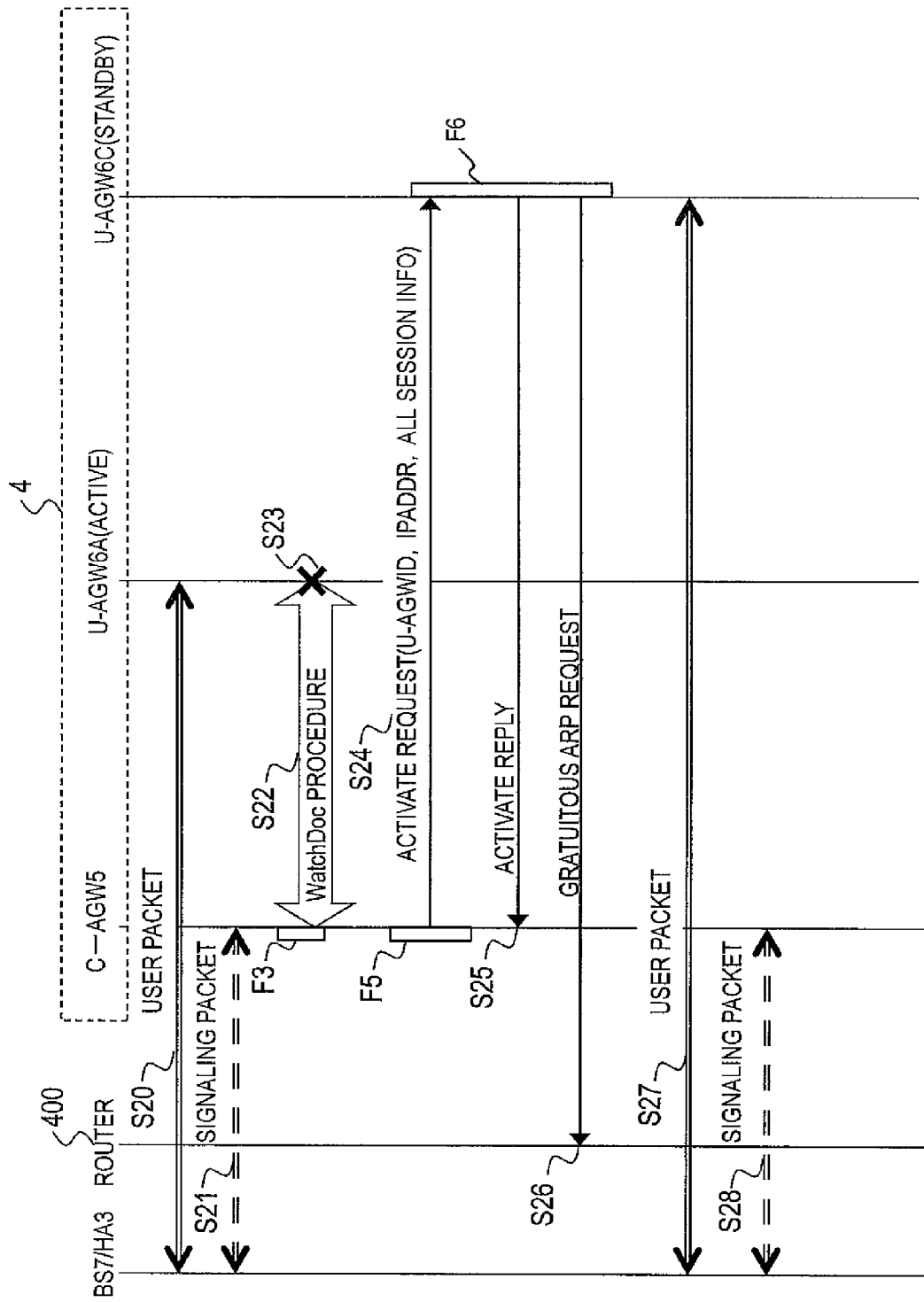

FIG. 12 is a sequence diagram illustrating an example of redundant control when a fault occurs during an operation of the active U-AGW 6a. In FIG. 12, the ordinate indicates time, and the abscissa indicates the apparatuses including the base station 7 or the home agent 3, the router 400, the active C-AGW 5a, the active U-AGW 6a, and the standby U-AGW 6c. Though not shown, processing below is executed between the active C-AGW 5a and the active U-AGW 6b.

In Step S20, the active U-AGW 6a transfers user data (user packet) between the base station 7 and the home agent 3 via the router 400. In Step S21, the active C-AGW 5a processes a control signal from the base station 7 or the home agent 3 via the router 400 as described above.

The active C-AGW 5a carries out WatchDog processing (F3) by the U-AGW monitor processing program 75 to transmit a WatchDog request to the active U-AGW 6a at each predetermined monitoring cycle (cycle of WatchDog timer). The WatchDog processing executed by the U-AGW monitor processing program 75 for the active U-AGW 6 is similar to that of the C-AGW monitor processing program 76 illustrated in FIGS. 7 and 10. The active C-AGW 5a transmits WatchDog requests to the active U-AGWs 6a and 6b in the predetermined monitoring cycle. If no WatchDog response may be received from the active U-AGW 6a or 6b, the active C-AGW 5a retransmits a WatchDog request in each fault judgment cycle, and detects a fault occurrence in the active U-AGW 6a or 6b when the number of retransmitting times reaches a predetermined number of times. WatchDog processing of the U-AGW monitor processing program 75 is similar to that of the C-AGW monitor processing program 76, and thus repeated description is omitted.

In Step S23, the active C-AGW 5a detects an occurrence of a fault in the U-AGW 6a as a result of the WatchDog processing for the active U-AGW 6a.

The active C-AGW 5a activates redundant control of the U-AGW 6 (F5). In this redundant control, the active C-AGW 5a obtains an identifier and an IP address of the faulty active U-AGW 6a, and selects all pieces of session information 71 (active session information 711 and idle session information 712) for the identifier. In Step S24, the active C-AGW 5a transmits an activate request containing the obtained identifier and IP address of the U-AGW 6a and all the selected pieces of session information 71 to the standby U-AGW 6c.

The standby U-AGW 6c that has received the activate request activates redundant control of the faulty active U-AGW 6 by the redundant control program 67 (F6). The standby U-AGW 6c obtains the identifier and the IP address contained in the activate request to set them therein. The standby U-AGW 6c obtains the session information 71 contained in the activate request to set the session information 71 in the packet transfer information 66.

In Step S25, the redundant control program 67 of the standby U-AGW 6c returns an active response to the activate request received from the active C-AGW 5a to the active C-AGW 5a. In Step S26, the standby U-AGW 6c sets the IP address (IP address of the faulty active U-AGW 6a) contained in the activate request therein, and then transmits a gratuitous ARP to the router 400 to change a transfer destination of the taken-over IP address (=B) to the standby U-AGW 6c.

In Step S27, the redundant control program 67 of the standby U-AGW 6c activates the packet transfer program 65 to activate transfer processing of user data.

Thus, the active C-AGW 5a monitors the active U-AGW 6. When detecting a fault in one of active U-AGWs 6, the active C-AGW 5a transmits an activate request containing an identifier, an IP address, and session information 71 of the faulty U-AGW 6 to the standby U-AGW 6c, thereby causing the standby U-AGW 6c to take over packet transfer processing.

Next, redundant control of the U-AGW 6 by the active C-AGW 5a executed in F5 of FIG. 12 is described.

Figure 13:
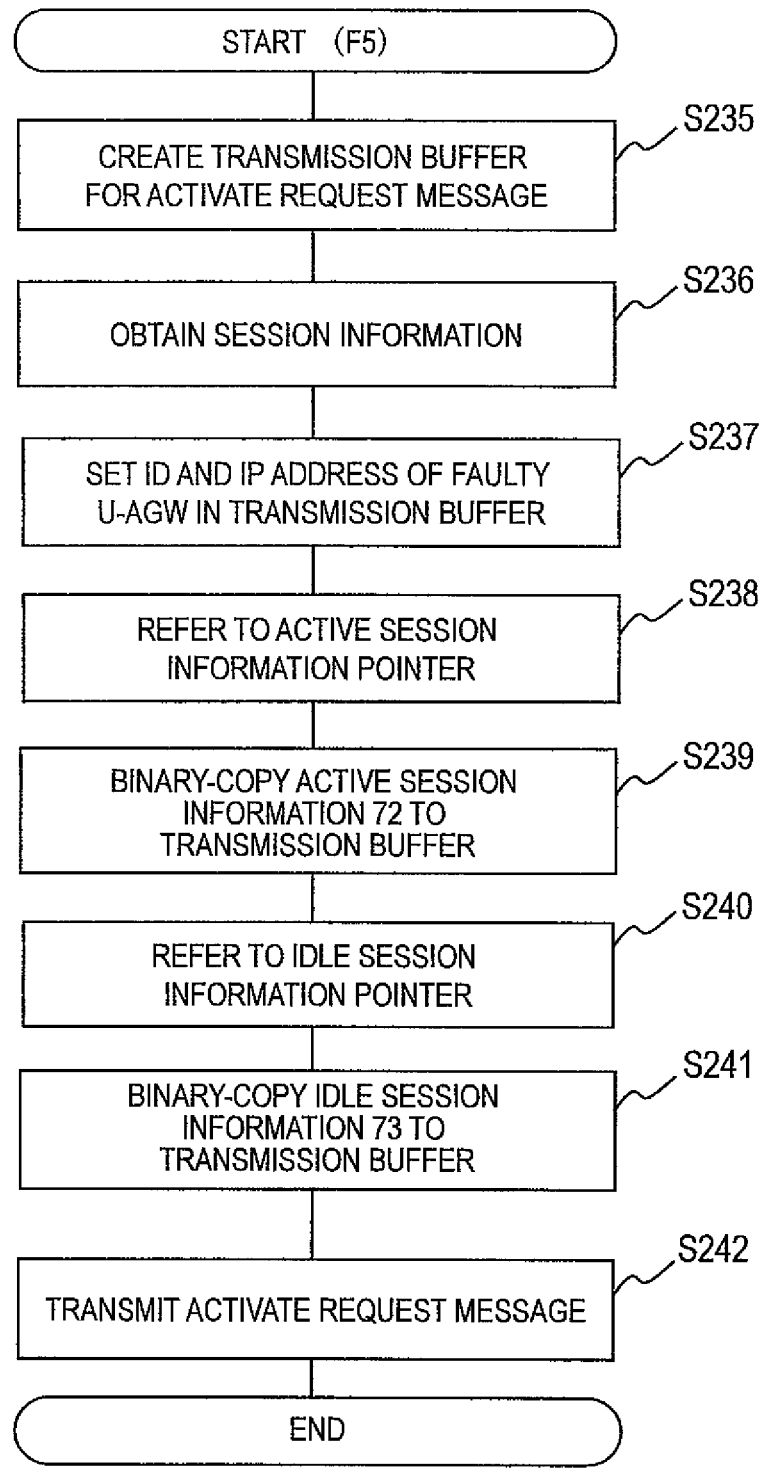
FIG. 13 is a flowchart illustrating an example of redundant control of the U-AGW 6 executed by the U-AGW monitor processing program 75 of the active C-AGW.

FIG. 13 is a flowchart illustrating an example of redundant control of the U-AGW 6 executed by the U-AGW monitor processing program 75 of the active C-AGW 5a. This processing is carried out when the U-AGW monitor processing program 75 detects a fault of the active U-AGW 6 in WatchDog processing.

In Step S235, the active C-AGW 5a sets a transmission buffer in the RAM 52 so as to transmit a message of an activate request for activating the standby U-AGW 6c.

In Step S236, the active C-AGW 5a obtains an identifier and an IP address of the faulty active U-AGW 6, and session information 71 corresponding to the identifier.

In Step S237, the identifier and the IP address of the faulty U-AGW 6 are set in the transmission buffer.

In Step S238, the active C-AGW 5a obtains session information 71 and active session information 711 specified by an active session information pointer 106 of the session information 71. In Step S239, the active C-AGW 5a copies packet transfer information of the session information 71 and the active session information 711 to the transmission buffer.

In Step S240, the active C-AGW 5a obtains idle session information 712 specified by an idle session information pointer 107 of the session information 71. In Step S241, the active C-AGW 5a copies packet transfer information of the idle session information 712 to the transmission buffer.

In Step S242, the active C-AGW 5a transmits contents of the transmission buffer to the standby U-AGW 6c.

Thus, the active C-AGW 5a transmits an activate request containing an identifier and packet transfer information of a faulty active U-AGW 6 to the standby U-AGW 6c.

Next, redundant control of the U-AGW 6 by the standby U-AGW 6c carried out in F6 of FIG. 12 is described.

Figure 14:
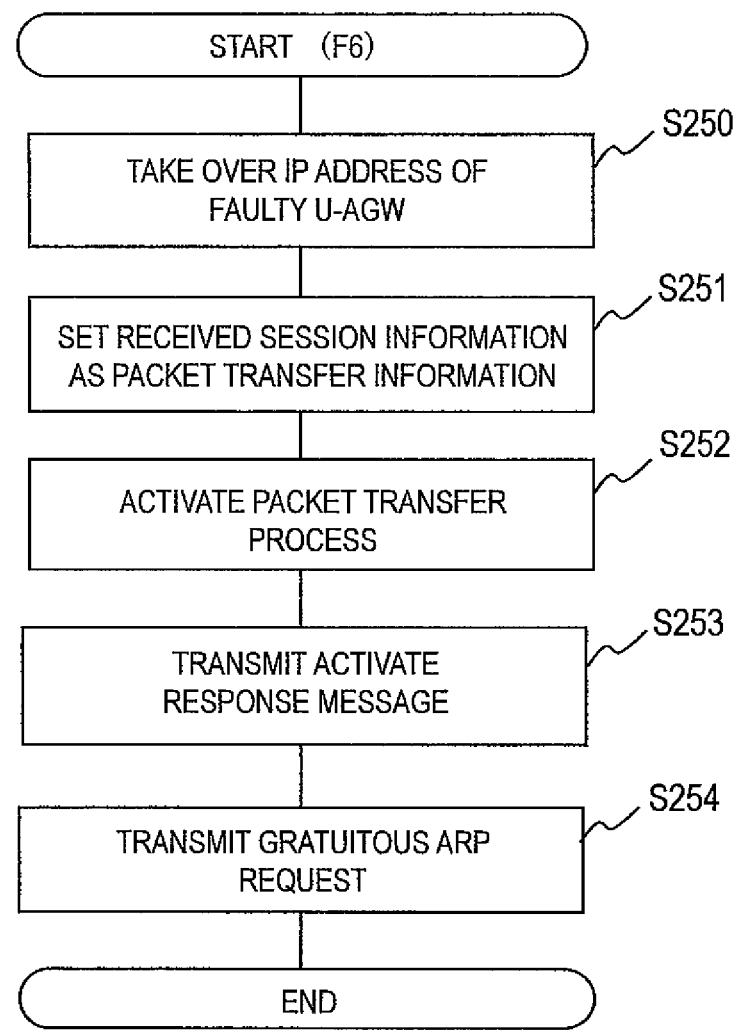
FIG. 14 is a flowchart illustrating an example of redundant control of the U-AGW 6 executed by the standby U-AGW.

FIG. 14 is a flowchart illustrating an example of redundant control of the U-AGW 6 executed by the standby U-AGW 6c. This processing is executed when an activate request is received from the active C-AGW 5a, which is executed mainly by the redundant control program 67.

In Step S250, the standby U-AGW 6c obtains an IP address contained in an activate request from the active C-AGW 5a.

In Step S251, the standby U-AGW 6c sets session information 71 contained in a message received from the active C-AGW 5a as packet transfer information in the RAM 62.

In Step S252, the standby U-AGW 6c activates the packet transfer program 65 to become active.

In Step S253, the standby U-AGW 6c returns an active response to the active C-AGW 5a.

In Step S254, the standby U-AGW 6c sets an IP address contained in the activate request therein. Then, the standby U-AGW 6c transmits a gratuitous ARP to the router 400 to change a transfer destination recognized by the router 400 for the taken-over IP address to the standby U-AGW 6c.

The standby U-AGW 6c activates transfer processing of user data by the activated packet transfer program 65.

Thus, the standby U-AGW 6c receives an activate request from the active C-AGW 5a to take over processing of the faulty active U-AGW 6.

As described above, according to the first embodiment of this invention, 1:1 redundancy is set in the control plane, and N+1 redundancy is set in the user plane. In the control plane, copies 71a-1 to 71a-N of pieces of information 71-1 to 71-N of user planes of N apparatuses are stored. In the control plane, for the active session information 71, copies 71a-1 to 71a-N of the standby system are updated to latest information in the predetermined update cycle. In the control plane, mirroring pieces of session information of all the user planes enables the standby control plane to take over processing within a short time period from a fault occurrence of the active system based on the copied session information 71a, and enables use for a network for providing voice services. In the control plane, no user data is transferred. Thus, even if the number of sessions increases, the control signal may be processed without any influence on throughput of packet transfer.

In the user plane, N+1 redundancy processing is carried out, and copying of packet transfer information is carried out in the control plane. Thus, user data throughput may be secured by concentrating on transfer of the user data. When the number of sessions increases, increasing the number of active apparatuses of the user plane enables dealing with the increase.

The standby U-AGW 6c of the user plane does not have to carry out processing during normal time. Thus, the standby U-AGW 6c may be in a cold standby status. In this case, power consumption of the standby U-AGW 6c may be reduced.

The example of using the WatchDog processing for monitoring the active control plane or the active user plane has been described. However, a well-known or known fault monitoring method may be used. For example, an occurrence of a fault may be judged by detecting a heartbeat of the active system.

Second Embodiment

Figure 15:
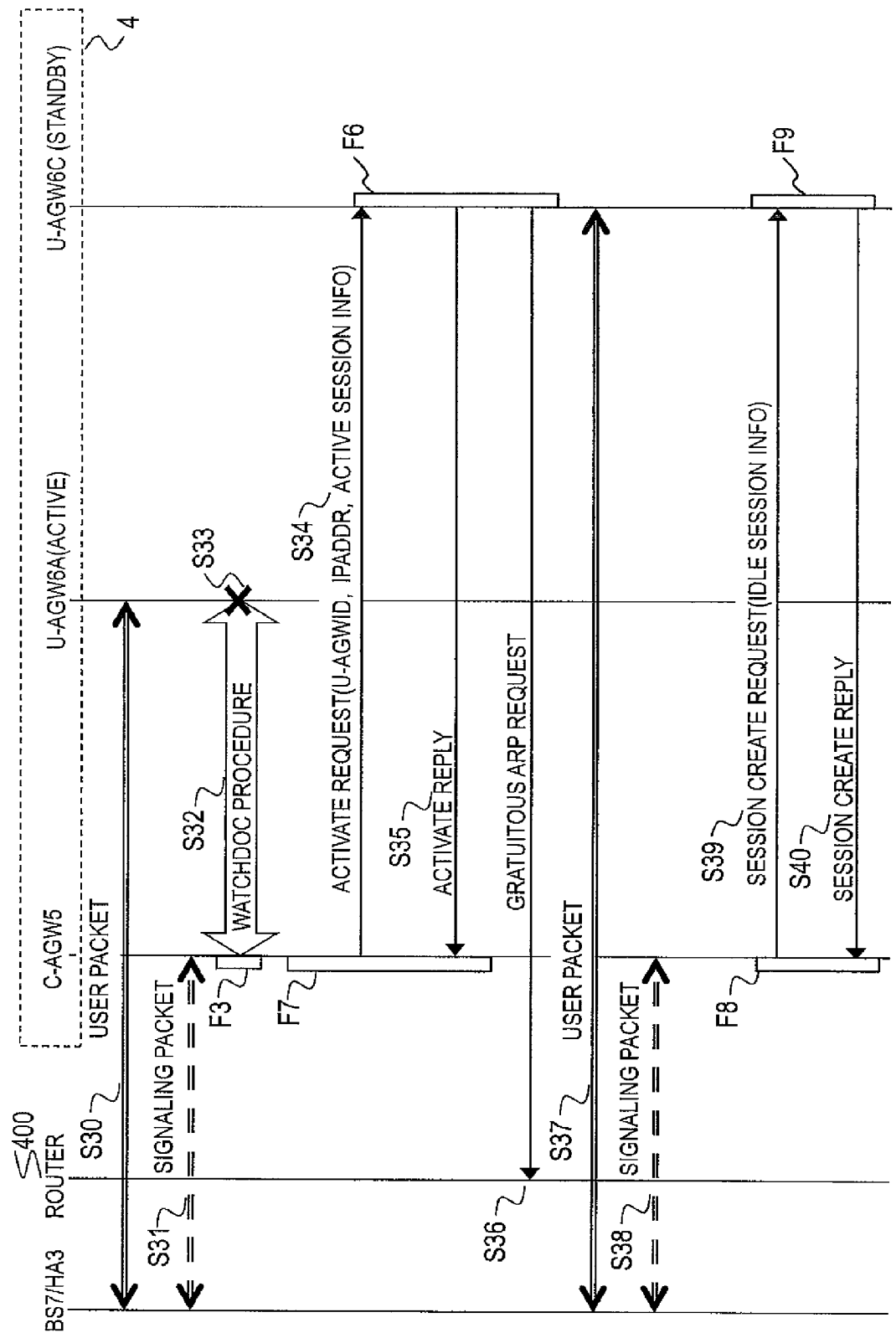
FIG. 15 is a sequence diagram illustrating a second embodiment of this invention.

FIG. 15 is a sequence diagram illustrating a second embodiment of this invention. According to the second embodiment, when processing is taken over from an active U-AGW 6 to a standby U-AGW 6c, active session information 711 is copied in packet transfer information 66 to recover transferring of user data, and then idle session information 712 is copied to the packet transfer information 66. Other components are similar to those of the first embodiment.

FIG. 15 is a sequence diagram illustrating an example of redundant control processing when a fault occurs during an operation of the active U-AGW 6a. In FIG. 15, an ordinate indicates time, and an abscissa indicates the apparatuses including the base station 7 or the home agent 3, the router 400, the active C-AGW 5a, the active U-AGW 6a, and the standby U-AGW 6c. Though not shown, processing below is executed between the active C-AGW 5a and the active U-AGW 6b.

As in the case illustrated in FIG. 12, in Step S30, the active U-AGW 6a transfers user data (user packet) with the base station 7 or the home agent 3 via the router 400. In Step S31, the active C-AGW 5a processes a control signal from the base station 7 or the home agent 3 via the router 400 as described above.

As in the case illustrated in FIG. 12, in Step S32, the active C-AGW 5a carries out WatchDog processing (F3) by a U-AGW monitor processing program 75 to monitor the active U-AGW 6.

In Step S33, the active C-AGW 5a detects an occurrence of a fault in the U-AGW 6a as a result of the WatchDog processing for the active U-AGW 6a.

The active C-AGW 5a activates redundant control processing of the U-AGW 6 (F7). In this redundant control processing, the active C-AGW 5a obtains the identifier and the IP address of the faulty active U-AGW 6a, and selects active session information 711 for the identifier.

In Step S34, the active C-AGW 5a transmits an activate request containing the obtained identifier and IP address of the U-AGW 6a and the selected active session information 711 to the standby U-AGW 6c. This processing of transmitting the activate request becomes first redundant control processing.

In the first embodiment, all the pieces of session information 71 where the idle session information 712 is added to the active session information 711 are transmitted. However, in the second embodiment, only active session information 711 of the session information 71 is transmitted. This is because a session status of a wireless network is focused described above referring to FIG. 2, and since the active session information 711 is session information indicating that a mobile station 8 is in an active status (ongoing communication or communication permitted status), immediate call saving is extremely important. On the other hand, since the idle session information 712 is session information indicating that the mobile station 8 is in an idle status (power-saving mode or noncommunication status), take-over priority may be reduced.

The standby U-AGW 6c that has received the activate request activates redundant control processing of the U-AGW 6 (F6). First, active session information 711 is extracted from a message of the received activate request to be set in packet transfer information 66.

In Step S35, the standby U-AGW 6c returns an active response to the received activate request to the active C-AGW 5a. The standby U-AGW 6c sets therein an IP address (IP address of a faulty active U-AGW 6a) contained in the activate request. In Step S36, the standby U-AGW 6c transmits gratuitous ARP to a router 400 to change a transfer destination of the taken-over IP address recognized by the router 400 to the standby U-AGW 6c. In Step S37, the standby U-AGW 6c activates a packet transfer program 65 to activate transfer processing of user data. In step 38, a control signal from a home agent 3 or a base station 7 is transmitted to the active C-AGW 5a via the router 400 to perform predetermined control signal processing.

In other words, the standby U-AGW 6c copies the active session information 711 to the packet transfer information 66 to transfer user data requested to be transferred by the base station 7, the mobile station 8, or the home agent 3. Thus, the standby U-AGW 6c that has taken over processing of the active U-AGW 6a enables transfer of user data in an extremely short-time.

Then, to transmit idle session information 712 yet to be transferred, the active C-AGW 5a executes session generation request processing (F8) for setting idle session information 712 in a message of a session create request to transmit the message. This session create request processing (F8) becomes second redundant control processing. In Step S39, the active G-AGW 5a transmits a created session create request to the standby U-AGW 6c that has activated to operate by taking over the processing of the active system.

A redundant control program 67 of the standby U-AGW 6c that has received the session generation request executes session create processing (F9) for extracting the idle session information 712 contained in the message of the session generation request to copy the information to packet transfer information 66. Thus, the standby U-AGW 6c resumes transferring of user data based on the active session information 711, and then copies the idle session information 712 to the packet transfer information 66, to thereby copy all the session information 71 of the active system that has processing taken over, to the packet transfer information 66.

In Step S40, the standby U-AGW 6c returns a session generation response indicating completion of the session generation request to the active C-AGW 5a.

As described above, the session information 71 is separated into information (active session information 711 and idle session information 712) to be set in a user plane and information (U-AGW_ID 101 to the number of idle sessions 105 in FIG. 5a) for managing the user plane, and the information to be set in the user plane is further separated into the active session information 711 and the idle session information 712. When the user plane of the standby system takes over that of the active system, in first redundant control processing, in the user plane of the standby system, the active session information 711 is copied to the packet transfer information 66. Thus, transferring of user data needed by the mobile station 8 and the home agent 3 may be quickly recovered. Then, after resumption of transferring of the user data in the user plane of the standby system, in second redundant control processing, the idle session information 712 is copied to the packet transfer information 66 of the user plane of the standby system. As a result, user data for all the sessions may be transferred.

Next, the processes F7 to F9 of FIG. 15 are described in detail. WatchDog processing (F3) and redundant control (F6) of the standby U-AGW 6c of FIG. 15 are similar to those of the first embodiment, and thus description thereof is omitted.

Figure 16:
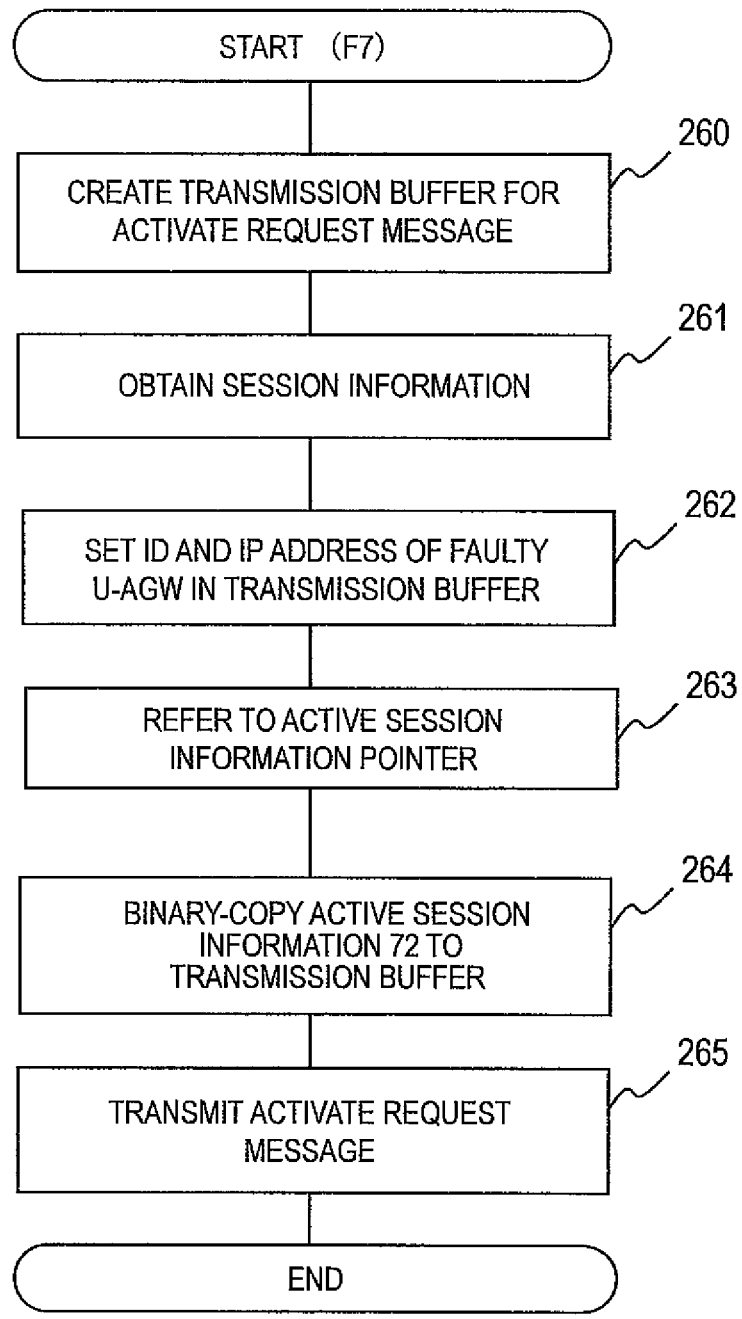
FIG. 16 is a flowchart illustrating an example of the above-mentioned first redundant control (F7) (illustrated in FIG. 15) of the U-AGW executed by the U-AGW monitor processing program 75 of the active C-AGW.

FIG. 16 is a flowchart illustrating an example of the above-mentioned first redundant control (F7) (illustrated in FIG. 15) of the U-AGW 6 executed by the U-AGW monitor processing program 75 of the active C-AGW 5a. This processing is carried out, as is illustrated in FIG. 10, when the U-AGW monitor processing program 75 has detected a fault of the active U-AGW 6 in WatchDog processing.

In Step S260, the active C-AGW 5a sets a transmission buffer in the RAM 52 so as to transmit a message of an activate request for activating the standby U-AGW 6c.

In Step S261, the active C-AGW 5a obtains the identifier and the IP address of the faulty active U-AGW 6, and session information 71 corresponding to the identifier.

In Step S262, the identifier and the IP address of the faulty U-AGW 6 are set in the transmission buffer.

In Step S263, the active C-AGW 5a obtain active session information 711 specified by an active session information pointer 106 of the session information 71. In Step S264, the active C-AGW 5a copies, of the active session information 711, packet transfer information has been preset to the transmission buffer.

In Step S265, the active C-AGW 5a transmits contents of the transmission buffer to the standby U-AGW 6c, as an activate request.

Thus, in the first redundant control processing, the active C-AGW 5a transmits an activate request containing the identifier and the IP address of a faulty active U-AGW 6 and active session information 711, to the standby U-AGW 6c. The standby U-AGW 6c takes over transferring of user data based only on the active session information 711 indicating session information of ongoing communication.

Figure 17:
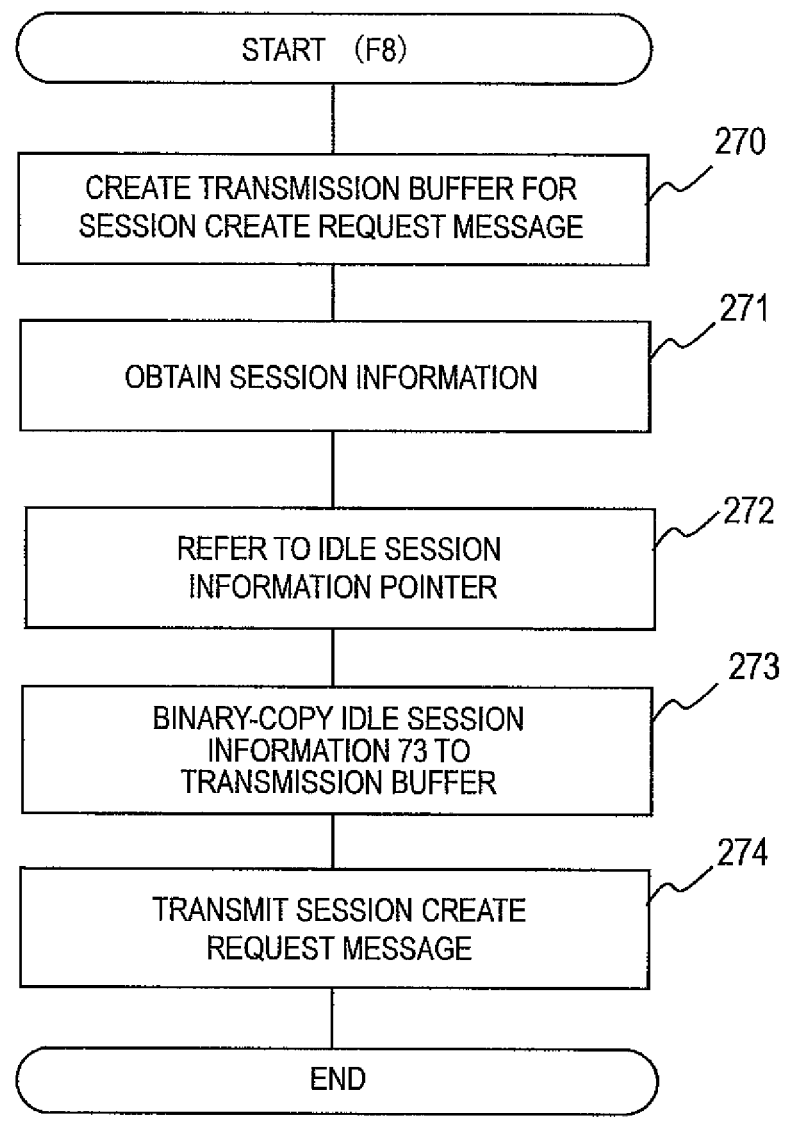

FIG. 17 is a flowchart illustrating an example of second redundant control processing (session generation request processing: F8) of the U-AGW 6 executed by the U-AGW monitor processing program 75 of the active C-AGW 5a. As illustrated in FIG. 15, this processing is executed after a lapse of predetermined time from completion of the first redundant control processing of FIG. 16. Alternatively, the processing may be executed when an active response is received from the standby U-AGW 6c. In Step S270, the active C-AGW 5a sets a transmission buffer in the RAM 52 to transmit a message of a session create request for copying remaining idle session information 712 to the standby U-AGW 6c.

In Step S271, the active C-AGW 5a obtains the identifier and the IP address of the faulty active U-AGW 6, and session information 71 corresponding to the identifier.

In Step S272, the identifier and the IP address of the faulty U-AGW 6 are set in the transmission buffer.

In Step S273, the active C-AGW 5a obtains idle session information 712 specified by an idle session information pointer 107 of the session information 71. The active C-AGW 5a copies, of the idle session information 711, predetermined packet transfer information to the transmission buffer.

In Step S274, the active C-AGW 5a transmits contents of the transmission buffer to the standby U-AGW 6c as a session create request.

Thus, in the first redundant control processing, the active C-AGW 5a transmits an activate request containing an identifier and an IP address of a faulty active U-AGW 6 and active session information 711 to the standby U-AGW 6c.

Figure 18:
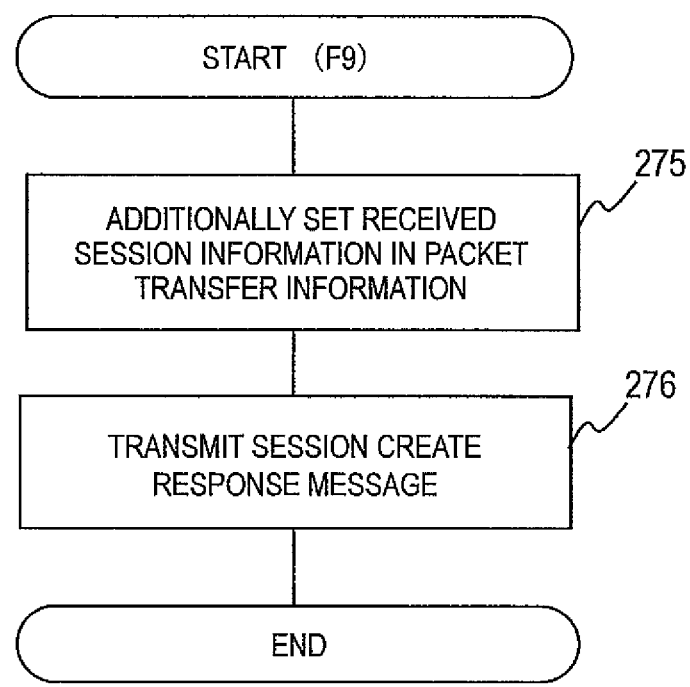

FIG. 18 is a flowchart illustrating an example of processing executed when the redundant control program 67 of the standby U-AGW 6c has received a session create request from the active C-AGW 5a.

In Step S375, the standby U-AGW 6c extracts idle session information 712 from the received session create request to add the request to packet transfer information 66. The standby U-AGW 6c finishes processing of the idle session information 71.

In the second redundant control processing, the standby U-AGW 6c adds the idle session information 712 to the packet transfer information 66 after the activate of transferring of the user data, thereby copying all the pieces of session information 71 of the faulty user plane to the standby C-AGW 6c.

Thus, in the standby user plane, after the activation of the packet transfer program 65, only the active session information 711 is copied to the packet transfer information 66 to activate transferring of the user data. Time for copying the idle session information 712 to the packet transfer information is accordingly made unnecessary, to thereby shorten downtime of the user plane. After the standby user plane takes over processing of the active system to activate its operation, for a session in an idle status (idle session information 712), the active control plane issues a session create request to supplement the packet transfer information 66 of the standby user plane, thereby restoring all the pieces of session information 71 in the standby user plane to secure reliability.

Third Embodiment

Figure 19:
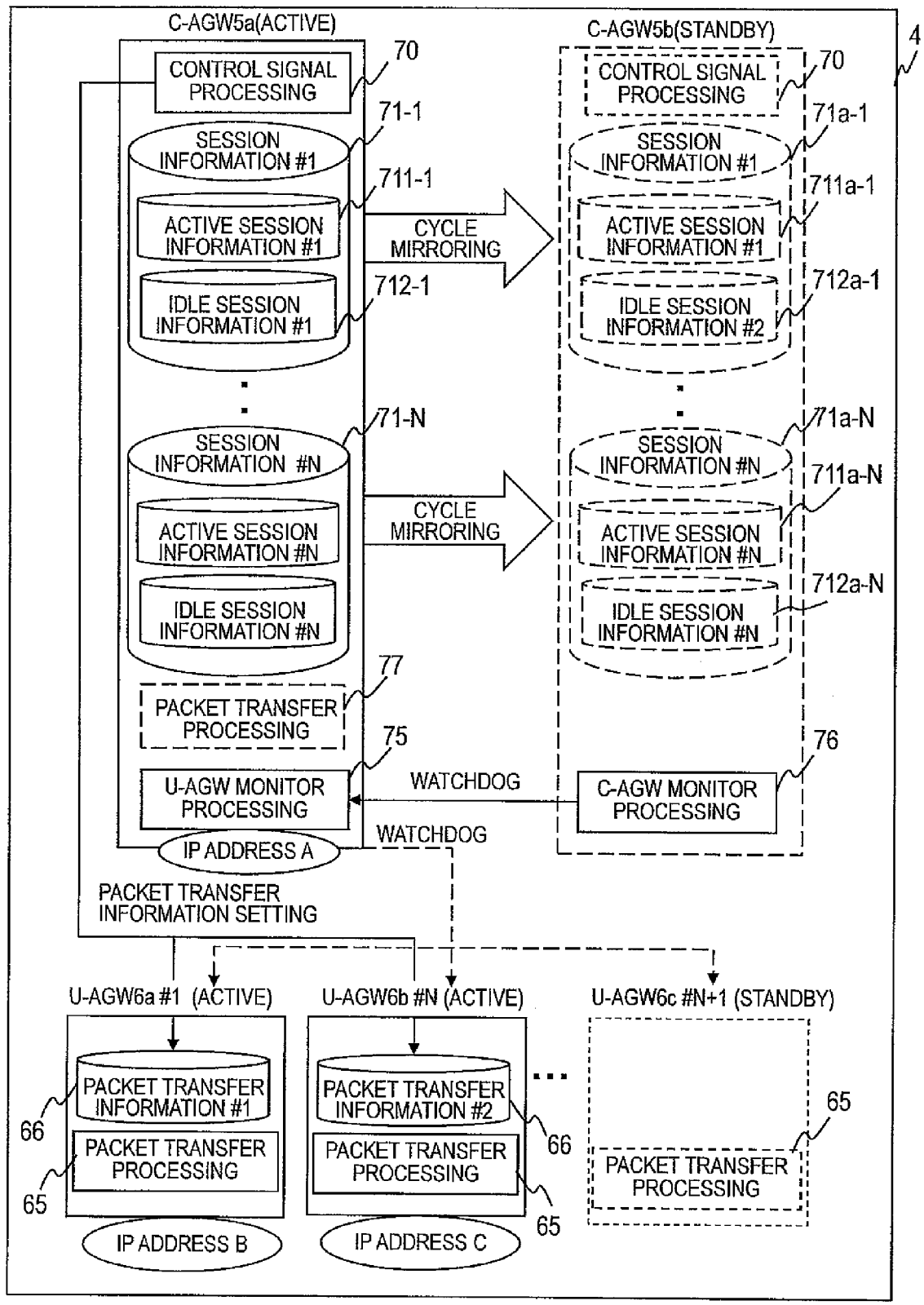
FIG. 19 is a block diagram illustrating a relationship of function elements between a control plane and a user plane according to a third embodiment.

FIG. 19 is a block diagram illustrating a relationship of function elements between a control plane and a user plane according to a third embodiment. In FIG. 19, a packet transfer program 77 for transferring user data is operable in the active C-AGW 5a of the first embodiment, and other components are similar to those of the first embodiment.

In the active C-AGW 5a, the packet transfer program 77 similar to the packet transfer program 65 of the U-AGW 6 is stored in a ROM 50. When a fault occurs in the active U-AGW 6, the active C-AGW 5a activates the packet transfer program 77 by a U-AGW monitor processing program 75. The packet transfer program 77 of the active C-AGW 5a executes, in place of the faulty active U-AGW 6, transferring of user data until redundant control processing is completed.

After the processing is taken over from the active U-AGW 6 by the standby U-AGW 6c, the U-AGW 6 monitor processing program 75 controls the packet transfer program 65 of the standby U-AGW 6c to take over processing of the packet transfer program 77 operating in the active C-AGW 5a, and then finishes the packet transfer program 77.

Figure 20:
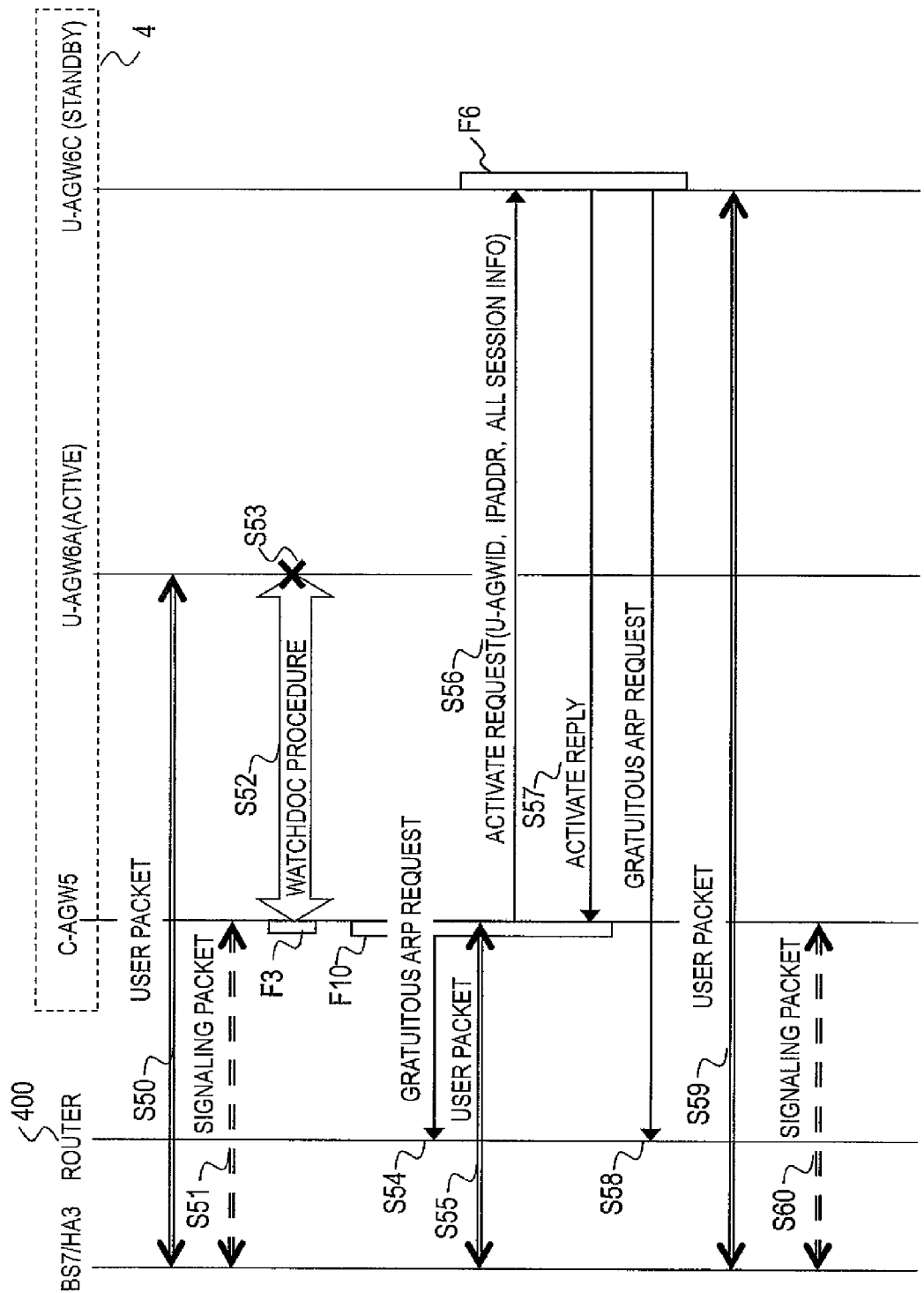

The flow of the processing is described below with reference to FIG. 20. FIG. 20 is a sequence diagram illustrating an example of redundant control processing when a fault occurs during an operation of the active U-AGW 6a. In FIG. 20, an ordinate indicates time, and an abscissa indicates the apparatuses including the base station 7 or the home agent 3, the router 400, the active C-AGW 5a, the active U-AGW 6a, and the standby U-AGW 6c. Though not shown, processing below is executed between the active C-AGW 5a and the active U-AGW 6b.

In FIG. 20, Steps S50 to S52 are similar to Steps S20 to S23, in which the active U-AGW 6 transfers user data with a base station 7 or a home agent 3, and the active C-AGW 5a executes processing of a control signal. The active C-AGW 5a carries out WatchDog processing in the predetermined monitoring cycle. In an example of FIG. 20, the active C-AGW 5a detects an occurrence of a fault in the active U-AGW 6a to activate redundant control processing (F10) of the U-AGW 6.

The active C-AGW 5a activates the packet transfer program 77 to be active, and obtains the identifier and the IP address of the faulty active U-AGW 6a and session information 71 corresponding to the identifier. In Step S54, the active C-AGW 5a allocates thereto the obtained IP address, and transmits gratuitous ARP for the IP address of the faulty active U-AGW 6a to a router 400 to change a transfer destination of user data recognized by the router 400 to the C-AGW 5a. Then, in Step S55, the active C-AGW 5a executes transferring of the user data based on the packet transfer program 77 and the session identifier 71 corresponding to the identifier, in place of the active U-AGW 6a.

The active C-AGW 5a obtains all pieces of session information 71 (active session information 711 and idle session information 712) corresponding to the identifier of the faulty active U-AGW 6a. In Step S56, the active C-AGW 5a transmits an activate request containing the identifier and the IP address of the U-AGW 6a and all the pieces of session information 71 that have been obtained, to the standby U-AGW 6c.

The standby U-AGW 6c that has received the activate request activates redundant control processing of the U-AGW 6 (F6). The standby U-AGW 6c obtains the identifier and the IP address contained in the activate request to set them therein. The standby U-AGW 6c obtains all the pieces of session information contained in the activate request to set them in the packet transfer information 66.

In Step S57, the standby U-AGW 6c returns an active response to the received activate request, to the active C-AGW 5a. In Step S58, simultaneously with this processing, the standby U-AGW 6c sets an IP address (IP address of the faulty active U-AGW 6a) contained in the activate request therein, and then transmits gratuitous ARP to a router 400 to change a transfer destination of the taken-over IP address recognized by the router 400 to the standby U-AGW 6c.

The active C-AGW 5a that has received the active response releases allocation for the IP address of the faulty active U-AGW 6a to finish the packet transfer program 77.

In Step S59, the standby U-AGW 6c activates a packet transfer program 65 to activate transfer processing of user data. In Step S60, the active C-AGW 5a dedicatedly performs processing of a control signal since alternate user data transfer has been finished.

As described above, the active C-AGW 5a monitors the active U-AGW 6, and when an occurrence of a fault is detected in any one of the active U-AGW 6, the active C-AGW 5a transfers user data of the faulty U-AGW 6 on its behalf. The active C-AGW 5a controls the standby U-AGW 6c to take over processing of the faulty U-AGW 6a while the active C-AGW 5a is transferring the user data on its behalf. After the standby U-AGW 6c has taken over the processing of the faulty U-AGW 6a, the active C-AGW 5a finishes the packet transfer program 77 to perform normal control signal processing.

Next, the processing F10 illustrated in FIG. 20 is described in detail. The WatchDog processing (F3) and the redundant control (F6) of the standby U-AGW 6c of FIG. 20 are similar to those of the first embodiment, and thus description thereof is omitted.

Figure 21:
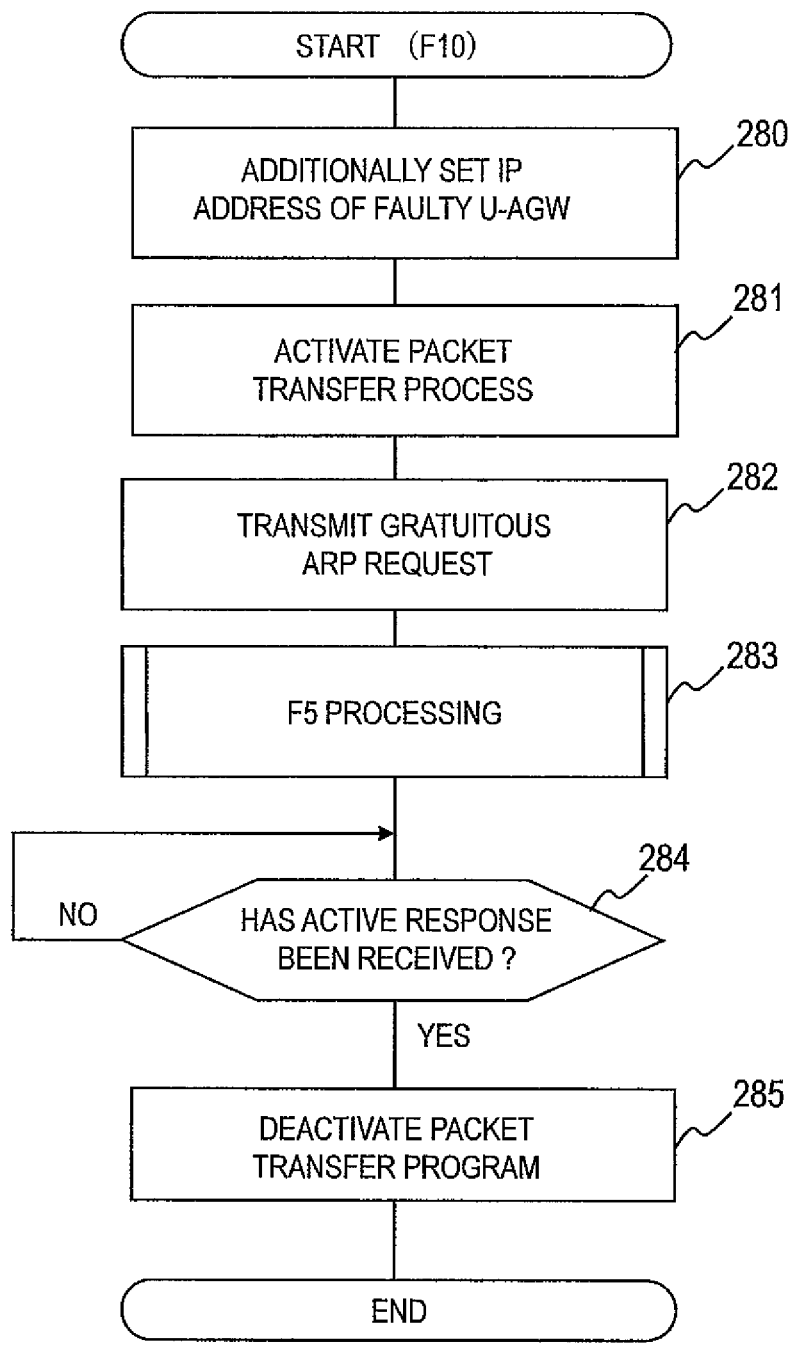
FIG. 21 is a flowchart illustrating an example of redundant control processing (F10) of the U-AGW 6 executed by the U-AGW monitor processing program 75 of the active C-AGW 5a illustrated in FIG. 20.

FIG. 21 is a flowchart illustrating an example of redundant control processing (F10) of the U-AGW 6 executed by the U-AGW monitor processing program 75 of the active C-AGW 5a illustrated in FIG. 20. As illustrated in FIG. 10, this processing is carried out when the U-AGW monitor processing program 75 has detected a fault of the active U-AGW 6 during WatchDog Processing.

In Step S280, the identifier and the IP address of the faulty active U-AGW 6a are obtained, and session information 71 corresponding to the identifier is obtained. The IP address of the faulty U-AGW 6a is additionally allocated to the active C-AGW 5a.

In Step 281, the active C-AGW 5a activates the packet transfer program 77 to be active.

In Step S282, the active C-AGW 5a allocates the obtained IP address thereto, and transmits gratuitous ARP to the router 400 for the IP address of the faulty active U-AGW 6a (S54). The active C-AGW 5a executes transferring of user data based on the packet transfer program 77 and session information 71 corresponding to the identifier, in place of the active U-AGW 6a (S55).

In Step S283, the active U-AGW 5a executes the redundant control processing illustrated in FIG. 12 of the first embodiment, and creates an activate request to transmit the request to the standby U-AGW 6c.

In Step S284, the active C-AGW 5a stands by until it receives an active response from the standby U-AGW 6c. In Step S285, after reception of the active response, the active C-AGW 5a deactivates (or stops) the packet transfer program 77 that has been performing transfer of the user data on behalf of the user plane, to thereby finish the processing.

Thus, since the active system of the control plane transfers the user data by proxy during when the processing is taken over from the active system of the user plane by the standby system, it is possible to further shorten downtime in which transferring of the user data stops. Thus, the access gateway apparatus 4 of this invention may be applied to a network that includes voice services such as VoIP in which voice quality has to be guaranteed. Applying this invention to an access gateway apparatus that processes a large-capacity session enables execution of call saving regardless of the amount of session information to be taken over.

Fourth Embodiment

Figure 22:
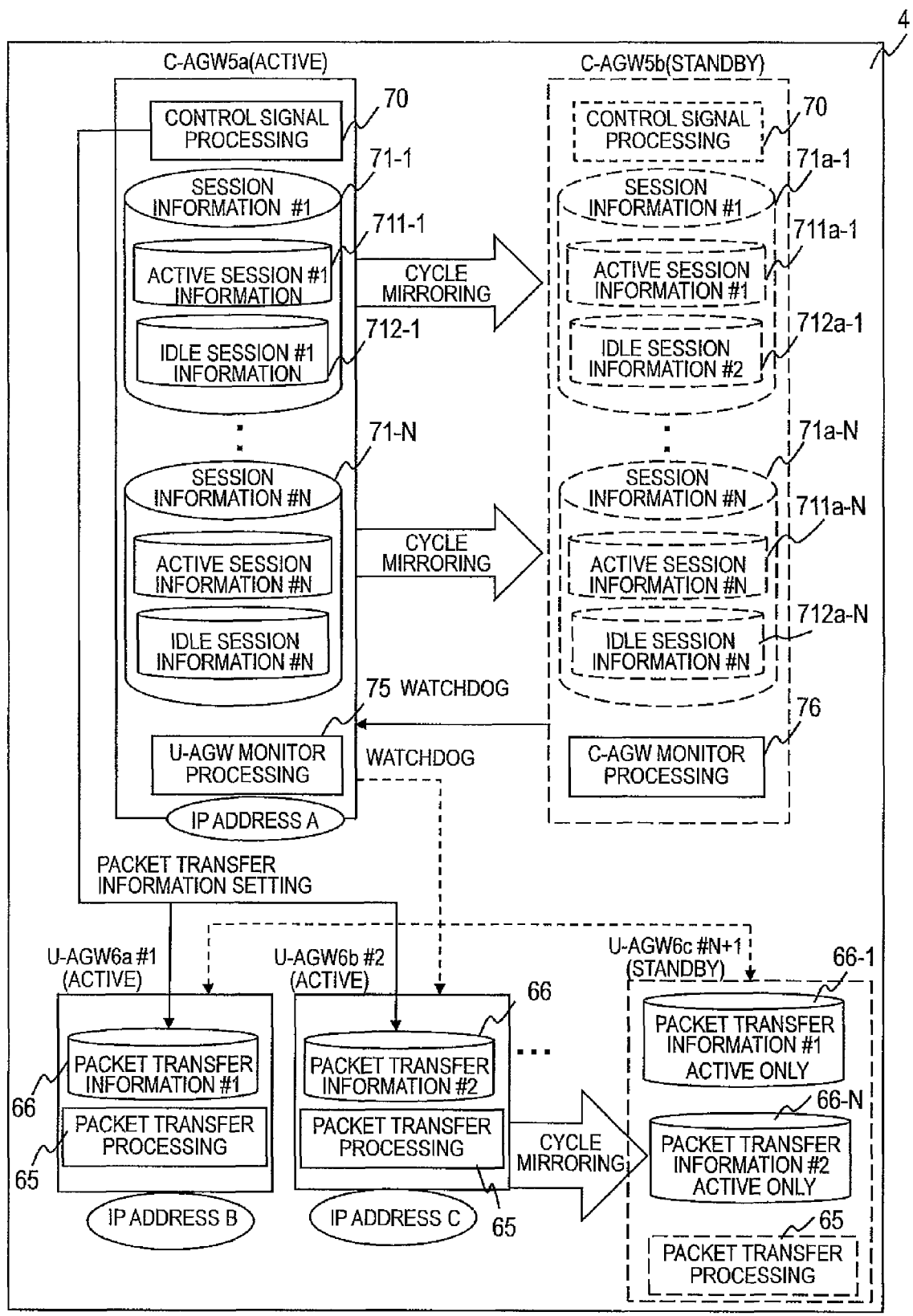
FIG. 22 is a block diagram illustrating a relationship of function elements between the C-AGW 5 and the U-AGW 6.

FIG. 22 illustrates a fourth embodiment, where contents of active session information 711 of each active system of the user plane of the first embodiment is stored in a standby U-AGW 6c, and other components are similar to those of the first embodiment.

FIG. 22 is a block diagram illustrating a relationship of function elements between the C-AGW 5 and the U-AGW 6. In FIG. 22, the C-AGW 5 is similar in configuration to that of the first embodiment, and a difference from the first embodiment is that the standby U-AGW 6c stores pieces of packet transfer information 66-1 to 66-N of active U-AGWs 6. A packet transfer program 65 of each active U-AGW 6 transmits packet transfer information 66 to the standby U-AGW 6c in the predetermined update cycle, and the standby U-AGW 6c updates the pieces of packet transfer information 66-1 to 66-N based on the received packet transfer information.

After reception of a notification that a fault has occurred in the active U-AGW 6 from the active C-AGW 5a, the standby U-AGW 6c deletes those other than packet transfer information 66 of the faulty active U-AGW 6 among the pieces of packet transfer information 66-1 to 66-N, and activates the packet transfer program 65 to take over transfer processing of user data.

Figure 23:
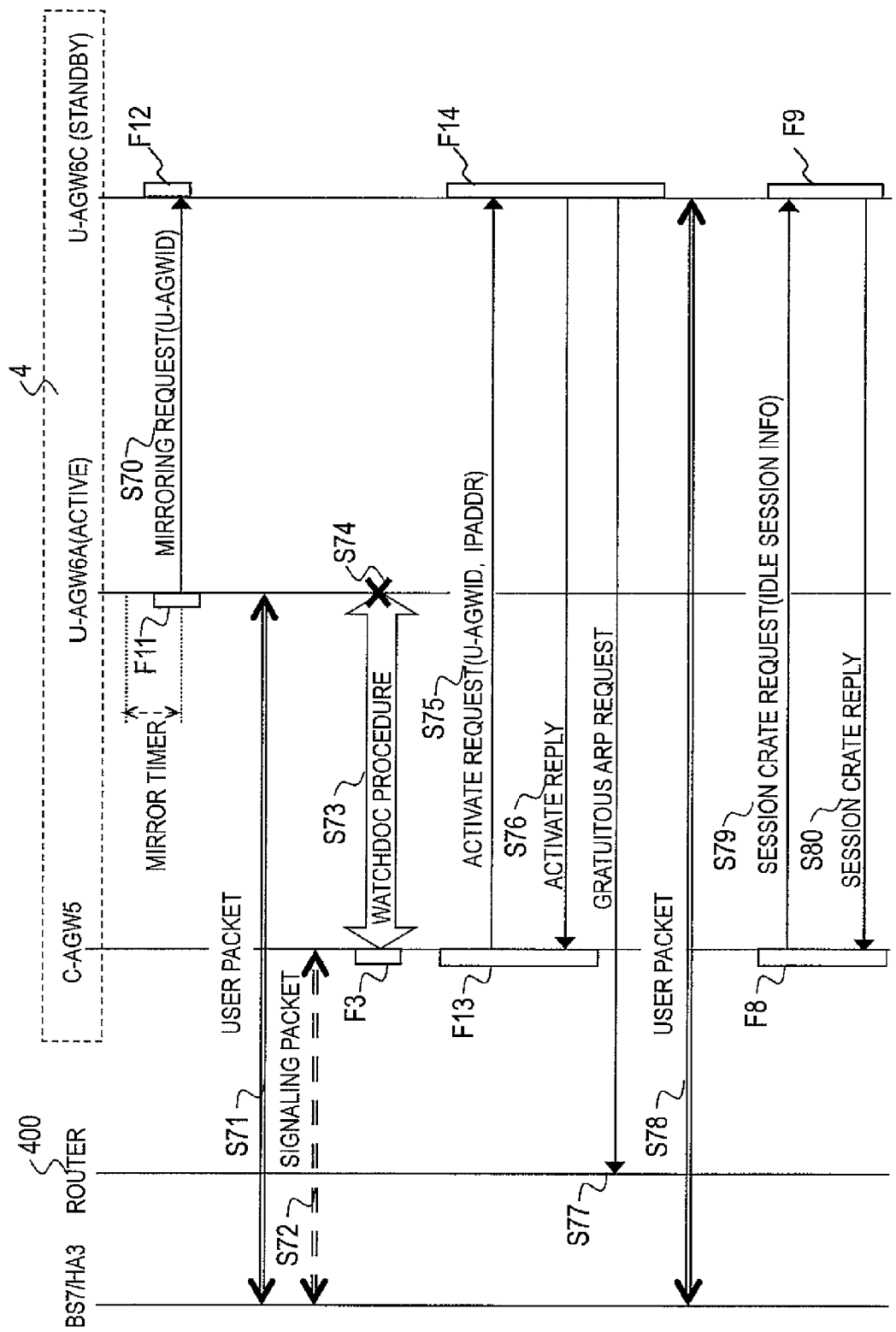

Redundant control of the active U-AGW 6 carried out in the access gateway apparatus 4 of FIG. 22 is described below. FIG. 23 is a sequence diagram illustrating an example of redundant control processing when a fault occurs during an operation of the active U-AGW 6a. In FIG. 23, an ordinate indicates time, and an abscissa indicates the apparatuses including the base station 7 or the home agent 3, the router 400, the active C-AGW 5a, the active U-AGW 6a, and the standby U-AGW 6c. Though not shown, processing below is executed between the active C-AGW 5a and the active U-AGW 6b.

In FIG. 23, in Step S70, the active U-AGW 6a executes mirroring processing, issues a mirroring request, to the standby U-AGW 6c each time a predetermined update cycle is reached, and copies active session information 711 of packet transfer information 66 to the standby U-AGW 6c. The standby U-AGW 6c receives the mirroring request from the active U-AGW 6a, and updates active session information 711 of packet transfer information 66 for each active U-AGW 6 to store the active session information 711 (F12).

Steps S71 to S73 are similar to Steps S20 to S23 in FIG. 12 of the first embodiment described above. The active U-AGW 6 transfers user data with a base station 7 or a home agent 3, and the active C-AGW 5a executes processing of a control signal. The active C-AGW 5a carries out WatchDog processing in the predetermined monitoring cycle. In an example of FIG. 23, the active C-AGW 5a detects an occurrence of a fault in the active U-AGW 6a to activate redundant control processing (F13) of the U-AGW 6.

In this redundant control, the active C-AGW 5a obtains an identifier and an IP address of the faulty active U-AGW 6a. In Step S75, the active C-AGW 5a transmits an activate request containing the obtained identifier and IP address of the U-AGW 6a to the standby U-AGW 6c.

The standby U-AGW 6c that has received the activate request activates redundant control of the U-AGW 6 (F14). The standby U-AGW 6c obtains the identifier and the IP address contained in the activate request to set them therein. The standby U-AGW 6c selects one of pieces of packet transfer information 66-1 to 66-N corresponding to the identifier contained in the activate request, and deletes those other than active session information 711 of the selected packet transfer information 66.

In Step S76, the standby U-AGW 6c returns an active response to the received activate request, to the active C-AGW 5a. In Step S77, the standby U-AGW 6c sets the IP address (IP address of the faulty active U-AGW 6a) contained in the activate request therein, and transmits gratuitous ARP to an opposite router 400 to change a transfer destination of the taken-over IP address.

In Step S78, the standby U-AGW 6c activates a packet transfer program 65 to activate transfer processing of user data based only on active session information 711 among pieces of packet transfer information 66-1 to 66-N.

In this case, to quickly transfer user data requested to be transferred by a base station 7, a mobile station 8 or a home agent 3, the standby U-AGW 6c preferentially copies only active session information 711 in the packet transfer information 66. Thus, the standby U-AGW 6c that has taken over processing of the active U-AGW 6a may resume transferring of user data within an extremely short time.

Then, to transmit idle session information 712 yet to be transferred, the active C-AGW 5a executes session generation request processing (F8) for setting idle session information 712 in a message of a session generation request to transmit the message. In Step S79, the active G-AGW 5a transmits a created session create request to the standby U-AGW 6c that has activated to operate by taking over the processing of the active system.

The standby U-AGW 6c that has received the session create request executes session create processing (F9) for extracting the idle session information 712 contained in the message of the session generation request to copy the idle session information 712 in packet transfer information 66. Thus, the standby U-AGW 6c resumes transferring of user data based on the active session information 711, and then copies the idle session information 712 to the packet transfer information 66, to thereby copy all the session information 71 of the active system that has processing taken over, to the packet transfer information.

In Step S80, the standby U-AGW 6c returns a session generation response indicating completion of the session generation request, to the active C-AGW 5a.

As described above, the session information 71 is separated into information (active session information 711 and idle session information 712) to be set in a user plane and information (U-AGW_ID 101 to the number of idle sessions 105 in FIG. 5a) for managing the user plane, and the information to be set in the user plane is further separated into the active session information 711 and the idle session information 712. When the user plane of the standby system takes over that of the active system, in the user plane of the standby system, the active session information 711 is copied to the packet transfer information 66. Thus, transferring of user data needed by the mobile station 8 and the home agent 3 may be quickly recovered. Then, after resumption of transferring of the user data in the user plane of the standby system, the idle session information 712 is copied to the packet transfer information 66 of the user plane of the standby system. As a result, user data for all the sessions may be transferred.

Next, each processing illustrated in FIG. 23 is described below in detail. WatchDog processing (F3), processing of setting idle session information 712 in a message of a session generation request to transmit the message (F8), and processing of copying a session generation request in the standby U-AGW 6c (F9) are similar to those of the first and second embodiment, and thus description thereof is omitted.

Figure 24:
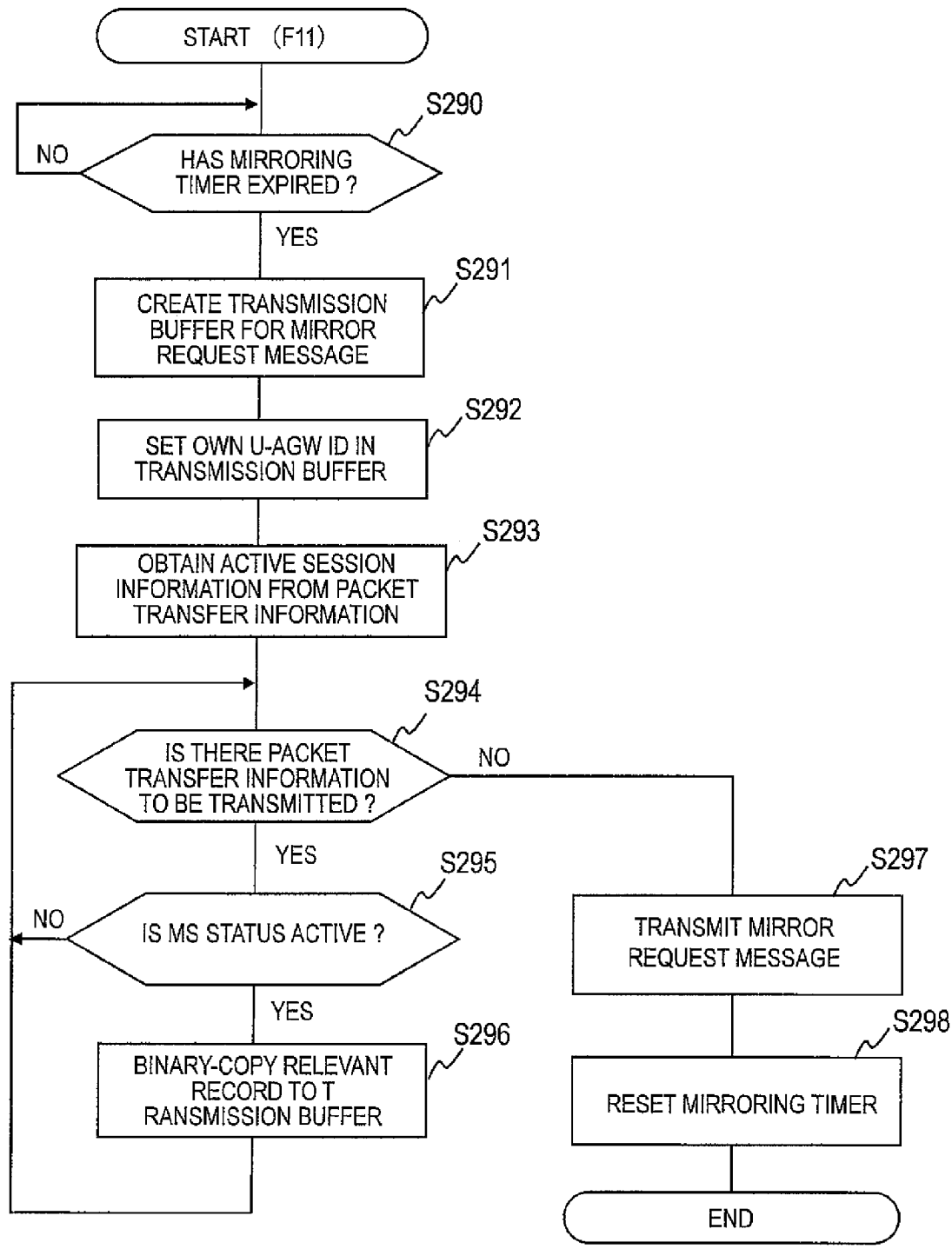
FIG. 24 is a flowchart illustrating an example of mirroring processing (F11) of the packet transfer information 66 carried out by the packet transfer program 65 of the active U-AGW 6a illustrated in FIG. 23.

FIG. 24 is a flowchart illustrating an example of mirroring processing (F11) of the packet transfer information 66 carried out by the packet transfer program 65 of the active U-AGW 6a illustrated in FIG. 23.

First, in Step S290, whether the mirroring timer of the active U-AGW 6a has reached a predetermined update cycle is judged. If the mirroring timer has not reached the predetermined update cycle, the process proceeds to Step S291.

In Step S291, the active U-AGW 6a sets a transmission buffer in the RAM 62 to transmit a message of a mirroring request for copying only active session information 711 of the packet transfer information 66 to the standby U-AGW 6c.

In Step S292, the active U-AGW 6a obtains its own identifier to set the identifier in the transmission buffer. In Step S293, the active U-AGW 6a obtains only the active session information 711 of the packet transfer information 66, and repeats the processing in Steps S294 to S296 to create a message of a mirroring request.

In Step S294, the processing in Steps S294 to S296 is repeated until there is no more entry of a transmission target storing the identifier of the MS ID 120 of the packet transfer information 66 illustrated in FIG. 6. If there is still an entry of a transmission target in the packet transfer information 66, proceeding to Step S295, whether MS status 125 is active is judged. If the MS status 125 is active, in Step S296, the entry (or record) is copied to the transmission buffer. If the MS status 125 is idle, returning to Step S294, the process is repeated.

After completion of processing for all the entries in Step S294, in Step S297, contents of the transmission buffer are transmitted as a mirroring request to the standby U-AGW 6c. The active U-AGW 6a resets the mirroring timer to prepare for next transmission.

Thus, the active U-AGW 6a transmits only the active session information 711 of the packet transfer information 66 to the standby U-AGW 6a in each predetermined update cycle.

Next, update processing of the pieces of packet transfer information 66-1 to 66-N carried out by the standby U-AGW 6c of FIG. 23 is described.

Figure 25:
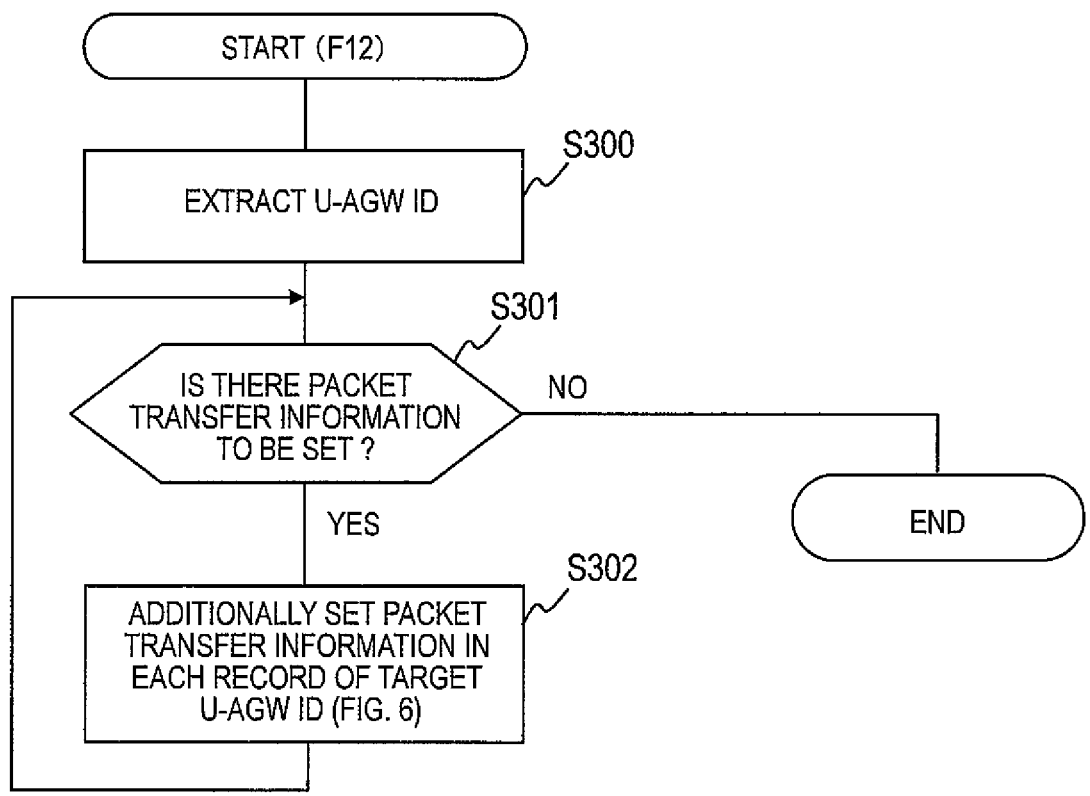
FIG. 25 is a flowchart illustrating an example of processing where the standby U-AGW 6c updates active session information 711 in the pieces of packet transfer information 66-1 to 66-N for each active U-AGW 6 (F12).

FIG. 25 is a flowchart illustrating an example of processing where the standby U-AGW 6c updates active session information 711 in the pieces of packet transfer information 66-1 to 66-N for each active U-AGW 6 (F12). This processing is carried out each time the standby U-AGW 6c receives a mirroring request from the active U-AGW 6a.

In Step S300, the standby U-AGW 6c extracts the identifier of a U-AGW 6 from the received mirroring request. In Step S301, the standby U-AGW 6c judges whether all the pieces of packet transfer information contained in the message of the received mirroring request have been read. If not all the pieces of packet transfer information have been read, proceeding to Step S302, the standby U-AGW 6c sets target packet transfer information in the pieces of packet transfer information 66-1 to 66-N corresponding to the identifier of the U-AGW 6. If all the pieces of packet transfer information have been read, the processing is finished.

Thus, based on the active session information 711 contained in the message of the mirroring request, the pieces of packet transfer information 66-1 to 66-N are updated for each identifier of the U-AGW 6 stored by the standby U-AGW 6c.

Next, activate request transmission processing (F13) that is first redundant control carried out by the U-AGW monitor processing program 75 of the active U-AGW 6a of FIG. 23 is described.

Figure 26:
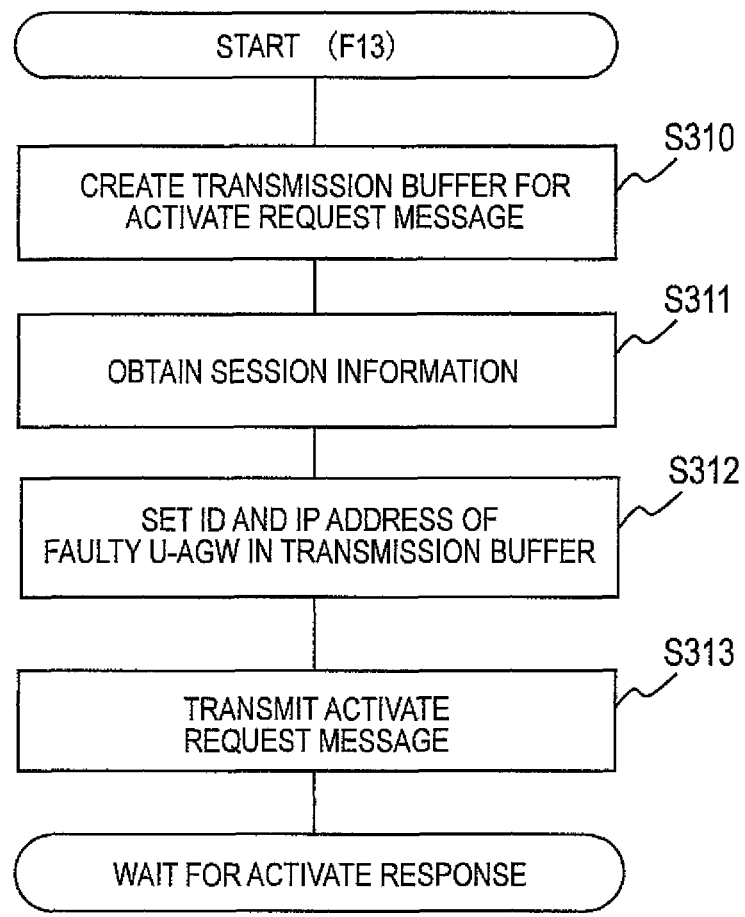
FIG. 26 is a flowchart illustrating an example of the first redundant control of the U-AGW 6 executed by the U-AGW monitor processing program 75 of the active C-AGW 5a illustrated in FIG. 23.

FIG. 26 is a flowchart illustrating an example of the first redundant control of the U-AGW 6 executed by the U-AGW monitor processing program 75 of the active C-AGW 5a illustrated in FIG. 23. As illustrated in FIG. 10, this processing is executed when the U-AGW monitor processing program 75 detects a fault of the active U-AGW 6 during Watch-Dog processing.

In Step S310, the active C-AGW 5a sets a transmission buffer in the RAM 52 so as to transmit a message of an activate request for activating the standby U-AGW 6c.

In Step S311, the active C-AGW 5a obtains the identifier and the IP address of the faulty active U-AGW 6.

In Step S312, the identifier and the IP address of the faulty U-AGW 6 are set in the transmission buffer.

In Step S313, the active C-AGW 5a transmits contents of the transmission buffer as an activate request to the standby U-AGW 6c.

Thus, in the first redundant control, the active C-AGW 5a transmits the activate request containing the identifier and the IP address of the faulty active U-AGW 6 to the standby U-AGW 6c. The standby U-AGW 6c takes over transferring of user data based only on the active session information 711 indicating session information of ongoing communication among the pieces of packet transfer information 66-1 to 66-N of the U-AGW 6 corresponding to the identifier contained in the activate request.

Figure 27:
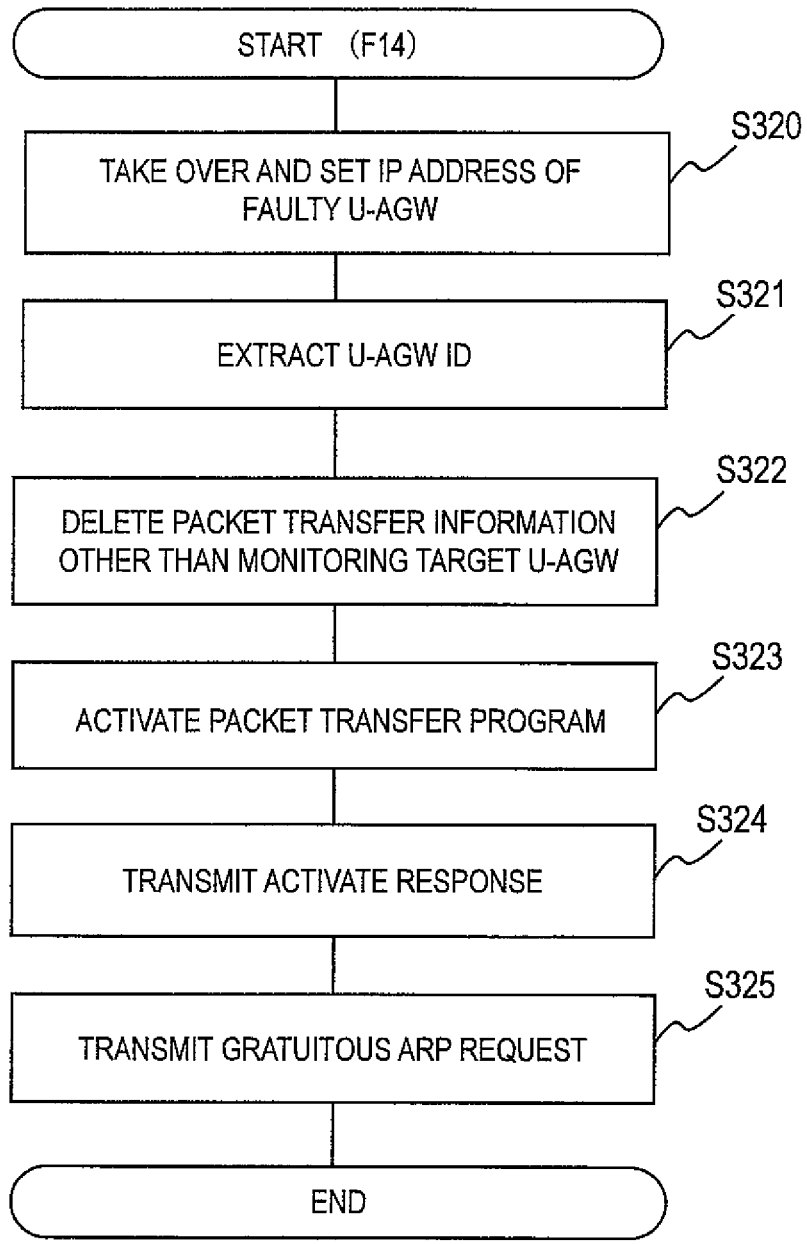
FIG. 27 is a flowchart illustrating an example of the first redundant control (F14) of the U-AGW 6 executed by the redundant control program 67 of the standby U-AGW 6c illustrated in FIG. 23.
Figure 28:
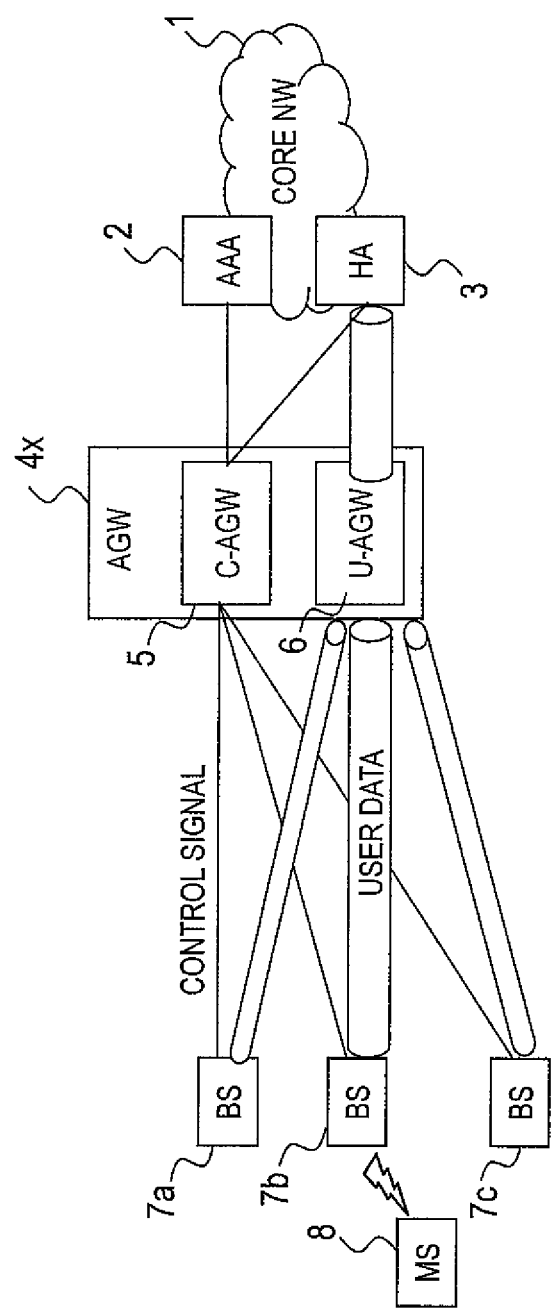
FIG. 28 illustrates a known example of a configuration of a network system using WiMAX.

FIG. 27 is a flowchart illustrating an example of the first redundant control (F14) of the U-AGW 6 executed by the redundant control program 67 of the standby U-AGW 6c illustrated in FIG. 23. As illustrated in FIG. 10, this processing is executed when an activate request is received from the active C-AGW 5a.

In Step S320, the standby U-AGW 6c obtains the IP address of the faulty active U-AGW 6 contained in the activate request from the active C-AGW 5a.

In Step S321, the standby U-AGW 6c obtains the identifier of the faulty U-AGW from a message received from the active C-AGW 5a.

In Step S322, the standby U-AGW 6c deletes pieces of packet transfer information 66-1 to 66-N other than that of the faulty active U-AGW 6. The standby U-AGW 6c may accordingly secure an area of the RAM 62 for user data transferring.

The standby U-AGW 6c starts the packet transfer program 65 to be active.

In Step S324, the standby U-AGW 6c returns an active response to the active C-AGW 5a.

In Step S325, the standby U-AGW 6c transmits gratuitous ARP to the router 400 for the IP address contained in the activate request to change a transfer destination of a user packet, and sets an IP address=B of the active U-AGW 6a therein.

The standby U-AGW 6c activates transfer processing of user data based on the activated packet transfer program 65.

Thus, the standby U-AGW 6c receives the activate request from the active C-AGW 5a to take over processing of the faulty active C-AGW 6.

According to the fourth embodiment, only the active session information 711 of the packet transfer information is copied from the active system of the user plane to the standby system. When a fault has occurred in the active U-AGW 6, among the plurality of pieces of packet transfer information 66-1 to 66-N held by the standby system, packet transfer information other than that of the faulty active U-AGW 6 is deleted. In the user plane of the standby system, only active session information 711 of the faulty user plane is left, and transfer processing of the user data is taken over based only on the active session information 711.

Thus, in the standby user plane, after activating of the packet transfer program 65, transferring of the user data is activated based only on the active session information 711 that has been obtained beforehand. As a result, a time corresponding to a period starting from a fault occurrence to transferring of the active session information 711 to the standby user plane is made unnecessary, enabling shortening of downtime of the user plane. After the standby user plane has taken over processing of the active system to activate its operation, for a session (idle session information 712) in an idle status, the active control plane issues a session generation request to supplement the packet transfer information 66 of the standby user plane, whereby all the pieces of session information 71 are restored in the standby user plane to secure reliability.

Each embodiment has been described by way of example where this invention is applied to WiMAX and ASN-GW. However, the access gateway apparatus 4 of this invention may be applied to a network system such as a 3GPP2 UMB system or a 3rd generation partnership project long term evolution (3GPP LTE).

Thus, this invention may be applied to a network system and a gateway apparatus that transmit/receive a great amount of information at high speed.

While the present invention has been described in detail and pictorially in the accompanying drawings, the present invention is not limited to such detail but covers various obvious modifications and equivalent arrangements, which fall within the purview of the appended claims.

What is claimed is:

1. A communication system comprising:
   a memory;
   a router connected to a first network and a second network; and
   an access gateway apparatus connected to the router, configured to transfer data by establishing a communication path between the first network and the second network,
   wherein:
   the access gateway apparatus comprises:
   a control computer configured to receive control signals from the first network and the second network to establish a communication path, thereby determining packet transfer information for the data; and
   a transfer computer configured to receive the packet transfer information from the control computer to transfer the data between the first network and the second network through the communication path contained in the packet transfer information;

the transfer computer comprises:
- a plurality of first transfer computers configured to execute the transfer of the data; and
- a second transfer computer configured to take over, when a fault occurs in any one of the plurality of first transfer computers, processing of the faulty one of the plurality of first transfer computers;

the control computer comprises:
- a session information notification unit configured to notify each of the plurality of first transfer computers of information containing the determined communication path as session information;
- a session information storage unit configured to store the session information for each identifier of the plurality of first transfer computers;
- a first fault monitoring unit configured to detect an occurrence of a fault in any one of the plurality of first transfer computers; and
- a first switching control unit configured to obtain, when the first fault monitoring unit detects the occurrence of the fault in any one of the plurality of the first transfer computers, an identifier and an address of the faulty one of the plurality of first transfer computers, and the session information set in faulty one of the plurality of the first transfer computers from the session information storage unit, and notifying the second transfer computer of the identifier, the address, and the session information that have been obtained;

the second transfer computer comprises a redundant control unit configured to set the identifier, the address, and the session information that have been received from the control computer in the second transfer computer to take over the transfer of the data;

the control computer comprises:
- a first control computer configured to receive the control signals from the first network and the second network to establish the communication path, thereby determining the packet transfer information for the data; and
- a second control computer configured to take over, when a fault occurs in the first control computer, processing of the faulty first control computer; and the second control computer comprises:
- a second fault monitoring unit configured to detect an occurrence of a fault in the first control computer;
- a session information copying unit configured to copy the session information from the first control computer in a predetermined cycle; and
- a second switching control unit configured to obtain, when the second fault monitoring unit detects the occurrence of the fault in the first control computer, an identifier and an address of the faulty first control computer, setting the identifier and the address that have been obtained in the second control computer, and taking over processing of the first control computer based on the session information copied by the session information copying unit.

2. The communication system according to claim 1, wherein:
the session information storage unit stores, for the session information, session information of ongoing communication as active session information for each of the plurality of first transfer computers, and session information of suspended communication as idle session information for each of the plurality of first transfer computers;

the first switching control unit is configured to:
- obtain, when the first fault monitoring unit detects the occurrence of the fault in the any one of the plurality of first transfer computers, the identifier, and the address of the faulty one of the plurality of first transfer computers, and the active session information set in the faulty one of the plurality of first transfer computers from the session information storage unit, and notify the second transfer computer of the identifier, the address, and the active session information that have been obtained; and
- notify, after the second transfer computer has taken over the transfer of the data, the second transfer computer of the idle session information set in the faulty one of the plurality of first transfer computers; and the redundant control unit sets, after taking-over of the transfer of the data based on the identifier, the address, and the active session information that have been received from the control computer, the active session information received from the control computer in the second transfer computer.

3. The computer system according to claim 1, wherein:
the first switching control unit comprises an alternate data transfer unit configured to execute the transfer of the data by proxy; and the first switching control unit is configured to:
- set, when the first fault monitoring unit detects the occurrence of the fault in the any one of the plurality of first transfer computers, the identifier and the address of the faulty one of the plurality of first transfer computers in the control computer;
- notify, after the session information set in the faulty one of the plurality of first transfer computers is obtained from the session information storage unit to activate the transfer of the data by the alternate data transfer unit, the second transfer computer of the identifier, the address, and the session information that have been obtained; and
- stop the alternate data transfer unit after the second transfer computer has taken over the processing of the first transfer computer.

4. The communication system according to claim 1, wherein:
the plurality of first transfer computers are each configured to:
- store, for the session information received from the control computer, session information of ongoing communication as active session information, and session information of suspended communication as idle session information; and
- transmit the active session information to the second transfer computer at predetermined cycles;

the second transfer computer stores the active session information received from the plurality of first transfer computers for each of the plurality of first transfer computers;

the first switching control unit is configured to:
- obtain, when the first fault monitoring unit detects the occurrence of the fault in the one of the plurality of first transfer computers, the identifier, and the address of the faulty one of the plurality of first transfer computers, and the idle session information set in the faulty one of the plurality of first transfer computers from the session information storage unit; and
- notify the second transfer computer of the identifier and the address that have been obtained, and after the second transfer computer has taken over the processing of the faulty one of the plurality of first transfer computers, notify the faulty one of the plurality of first transfer computers of the idle session information set in the faulty one of the plurality of first transfer computers; and the second transfer computer is configured to:
set the identifier and the address that have been received from the first switching control unit in the faulty one of the plurality of first transfer computers; and
store, after the active session information corresponding to the identifier has been obtained to take over the transfer of the data of the faulty one of the plurality of first transfer computers, the idle session information received from the first switching control unit.

5. A method of controlling an access gateway apparatus for transferring data by establishing a communication path between a first network and a second network, the access gateway apparatus comprising:
a control computer configured to receive control signals from the first network and the second network to establish the communication path, thereby determining packet transfer information for the data; and
a transfer computer configured to receive the packet transfer information from the control computer to transfer the data between the first network and the second network through the communication path contained in the packet transfer information;

the control computer comprising:
a first control computer configured to receive the control signals from the first network and the second network to establish the communication path, thereby determining packet transfer information for the data; and
a second control computer configured to take over, when a fault occurs in the first control computer, processing of the faulty first control computer;

the transfer computer comprising:
a plurality of first transfer computers configured to execute the transfer of the data; and
a second transfer computer configured to take over, when a fault occurs in one of the plurality of first transfer computers, processing of the faulty one of the plurality of first transfer computers;

the method comprising:
notifying, by the control computer, each of the plurality of first transfer computers of information containing the determined communication path as session information;
storing, by the control computer, the session information for each identifier of the plurality of first transfer computers in a session information storage unit;
detecting, by the control computer, an occurrence of a fault in any one of the plurality of first transfer computers;
obtaining, by the control computer, when the occurrence of the fault in the one of the plurality of first transfer computers is detected, an identifier and an address of the faulty one of the plurality of first transfer computers, and the session information set in the faulty one of the plurality of first transfer computers from the session information storage unit, and notifying the second transfer computer of the identifier, the address, and the session information that have been obtained;
setting, by the second transfer computer, the identifier, the address, and the session information that have been received from the control computer in the second transfer computer to take over the transfer of the data;
detecting, by the second control computer, the occurrence of the fault in the first control computer;
copying the session information from the first control computer to the second control computer in a predetermined cycle; and
obtaining, by the second control computer, when the occurrence of the fault in the first control computer is detected, an identifier and an address of the faulty first control computer, setting the identifier and the address that have been obtained in the second control computer, and taking over the processing of the first control computer based on the copied session information.

6. The method of controlling an access gateway apparatus according to claim 5, further comprising:
storing, by the session information storage unit, for the session information, session information of ongoing communication as active session information for each of the plurality of first transfer computers, and session information of suspended communication as idle session information for each of the plurality of first transfer computers;
obtaining, by the control unit, when the occurrence of the fault in the one of the plurality of first transfer computers is detected, the identifier and the address of the faulty one of the plurality of first transfer computers, and the active session information set in the one of the plurality of first transfer computers from the session information storage unit, and notifying the second transfer computer of the identifier, the address, and the active session information that have been obtained;
setting, by the second transfer computer, the identifier, the address, and the active session information that have been received from the control computer to take over the processing of the transfer of the data;
notifying, after the second transfer computer has taken over the transfer of the data, the second transfer computer of the idle session information set in the faulty one of the plurality of first transfer computers; and
setting, by the second transfer computer, the active session information received from the control computer in the second transfer computer.

7. The method of controlling an access gateway apparatus according to claim 5, further comprising:
setting, by the control computer, when the occurrence of the fault in the one of the plurality of first transfer computers is detected, the identifier and the address of the faulty one of the plurality of first transfer computers in the control computers, and obtaining the session information set in the faulty one of the plurality of first transfer computers from the session information storage unit to activate the transfer of the data in place of the one of the plurality of first transfer computer,
notifying, by the control computer, the second transfer computer of the identifier, the address, and the session information that have been obtained;
taking over, by the second transfer computer, the processing of the one of the plurality of first transfer computers based on the identifier, the address, and the session information that have been received from the control computer; and
stopping, by the control computer, the transfer of the data after the second transfer computer has taken over the processing of the one of the plurality of first transfer computers.

8. The method of controlling an access gateway apparatus according to claim 5, further comprising:
storing, by each of the plurality of first transfer computers, for the session information received from the control computer, session information of ongoing communication as active session information, and session information of suspended communication as idle session information, and transmitting the active session information to the second transfer computer at predetermined cycles;

storing, by the second transfer computer, the active session information received from the plurality of first transfer computers for the each of the plurality of first transfer computers;

obtaining, by the control computer, when the occurrence of the fault in the one of the plurality of first transfer computers is detected, the identifier and the address of the faulty one of the plurality of first transfer computers, and notifying the second transfer computer of the identifier and the address that have been obtained;

setting, by the second transfer computer, the identifier and the address that have been received from the control computer in the second transfer computer, and obtaining the active session information corresponding to the identifier from the stored active session information to take over the processing of the one of the plurality of first transfer computers;

notifying, by the control computer, after the second transfer computer has taken over the processing of the faulty one of the plurality of first transfer computers, the second transfer computer of the idle session information set in the one of the plurality of first transfer computers; and storing, by the second transfer computer, the idle session information received from the control computer.

9. An access gateway apparatus for transferring data by establishing a communication path between a first network and a second network, comprising:

a memory;

a control computer configured to receive control signals from the first network and the second network to establish the communication path, thereby determining packet transfer information for the data; and a transfer computer configured to receive the packet transfer information from the control computer to transfer the data between the first network and the second network through the communication path contained in the packet transfer information, wherein:

the transfer computer comprises:
  a plurality of first transfer computers configured to execute the transfer of the data; and
  a second transfer computer configured to take over, when a fault occurs in any one of the plurality of first transfer computers, processing of the faulty one of the plurality of first transfer computers;

the control computer comprises:
  a session information notification unit configured to notify each of the plurality of first transfer computers of information containing the determined communication path as session information;
  a session information storage unit configured to store the session information for each identifier of the plurality of first transfer computers;
  a first fault monitoring unit configured to detect an occurrence of a fault in any one of the plurality of first transfer computers; and
  a first switching control unit configured to obtain, when the first fault monitoring unit detects the occurrence of the fault in the one of the plurality of first transfer computers, an identifier, and an address of the faulty one of the plurality of first transfer computers, and the session information set in the one of the plurality of first transfer computers from the session information storage unit, and to notify the second transfer computer of the identifier, the address, and the session information that have been obtained;

the second transfer computer comprises a redundant control unit configured to set the identifier, the address, and the session information that have been received from the control computer in the second transfer computer to take over the transfer of the data;

the control computer comprises:
  a first control computer configured to receive the control signals from the first network and the second network to establish the communication path, thereby determining the packet transfer information for the data; and
  a second control computer configured to take over, when a fault occurs in the first control computer, processing of the faulty first control computer; and the second control computer comprises:
  a second fault monitoring unit configured to detect an occurrence of a fault in the first control computer;
  a session information copying unit configured to copy the session information from the first control computer in a predetermined cycle; and
  a second switching control unit configured to obtain, when the second fault monitoring unit detects the occurrence of the fault in the first control computer, an identifier and an address of the faulty first control computer, setting the identifier and the address that have been obtained in the second control computer, and to take over the processing of the first control computer based on the session information copied by the session information copying unit.

* * * * *